US011529759B2

(12) United States Patent
Nakajima

(10) Patent No.: US 11,529,759 B2
(45) Date of Patent: Dec. 20, 2022

(54) DECORATIVE SHEET, EMBOSSING METHOD AND EMBOSSING DIE

(71) Applicant: SEIREN CO., LTD., Fukui (JP)

(72) Inventor: Shigeru Nakajima, Fukui (JP)

(73) Assignee: SEIREN CO., LTD.

( * ) Notice: Subject to any disclaimer, the term of this patent is extended or adjusted under 35 U.S.C. 154(b) by 0 days.

(21) Appl. No.: 16/969,219

(22) PCT Filed: Jan. 22, 2019

(86) PCT No.: PCT/JP2019/001932
§ 371 (c)(1),
(2) Date: Aug. 12, 2020

(87) PCT Pub. No.: WO2019/159612
PCT Pub. Date: Aug. 22, 2019

(65) Prior Publication Data
US 2020/0406529 A1 Dec. 31, 2020

(30) Foreign Application Priority Data
Feb. 13, 2018 (JP) ............................. JP2018-022787

(51) Int. Cl.
*B29C 59/04* (2006.01)
*B29C 43/22* (2006.01)

(52) U.S. Cl.
CPC ............ *B29C 59/04* (2013.01); *B29C 43/222* (2013.01); *B29C 43/224* (2013.01); *B29C 2791/003* (2013.01)

(58) Field of Classification Search
CPC combination set(s) only.
See application file for complete search history.

(56) References Cited

U.S. PATENT DOCUMENTS

| 2009/0114347 A1 | 5/2009 | Gelli |
| 2017/0334127 A1 | 11/2017 | Kitano et al. |

FOREIGN PATENT DOCUMENTS

| EP | 1497109 B1 * | 3/2011 | ............... B31F 1/07 |
| JP | 5569426 A | 5/1980 | |
| JP | 2000008538 A * | 1/2000 | |
| JP | 2000038000 A * | 2/2000 | |
| JP | 2005261581 A | 9/2005 | |
| JP | 2007276285 A | 10/2007 | |
| JP | 2010188608 A | 9/2010 | |
| JP | 5913755 B1 | 5/2016 | |

OTHER PUBLICATIONS

International Search Report for Application No. PCT/JP2019/001932 dated May 7, 2019, 1 page.

* cited by examiner

*Primary Examiner* — Jennifer Bahls
(74) *Attorney, Agent, or Firm* — Lerner, David, Littenberg, Krumholz & Mentlik, LLP

(57) ABSTRACT

A decorative sheet includes a base material and a plurality of concave portions. The plurality of concave portions are provided on a front face of the base material. In the concave portion, a depth direction coincides with a thickness direction of the base material. The plurality of concave portions includes a first concave portion and a second concave portion. The first concave portion includes a first concavo-convex pattern on a first inner surface of the first concave portion. The second concave portion does not include the first concavo-convex pattern on a second inner surface of the second concave portion.

6 Claims, 11 Drawing Sheets

DECORATIVE SHEET, EMBOSSING METHOD AND EMBOSSING DIE

CROSS-REFERENCE TO RELATED APPLICATIONS

This application is a national phase entry under 35 U.S.C. § 371 of International Application No. PCT/JP2019/001932 filed Jan. 22, 2019, which claims the priority from Japanese Patent Application No. 2018-022787 filed in the Japanese Patent Office on Feb. 13, 2018, the entire contents of which are hereby incorporated by reference.

TECHNICAL FIELD

The present invention relates to a decorative sheet, an embossing method for manufacturing the decorative sheet and an embossing die for manufacturing the decorative sheet.

BACKGROUND

Techniques related to decorative sheets have been proposed. For example, in patent document 1, a seat skin material for a vehicle is disclosed. The seat skin material has a concavo-convex pattern. The seat skin material is manufactured as follows. That is, in the manufacturing method of the seat skin material, a laminated sheet passes between an embossing roll and a heat roll while being pressed. The laminated sheet is formed by laminating and integrating a front face fabric and a base material which is a cushion layer or by laminating and integrating the front face fabric and a fibrous base material. The embossing roll is set at a temperature of 100 to 250° C. The heat roll is set at a temperature of 100 to 250° C. The processing speed is set at 0.3 to 10 m/min. This manufacturing method can be performed by arranging a calender roll on the opposite side to the heat roll so as to be in contact with the embossing roll. The laminated sheet is in contact with the circumferential of the embossing roll by half.

In patent document 2, a seat skin material is disclosed. The seat skin material is formed by giving an embossed pattern to the front face of an elongated material. The manufacturing method includes a step of pressing the elongated material. In this step, the elongated material passes between an embossing roll and a flat roll. The embossing roll is provided with a plurality of embossing portions protruding from a base surface. The embossing portions include long side surfaces and short side surfaces. The long side surfaces and the short side surfaces are formed perpendicular to the base surface of the embossing roll. In the embossing portions, the highest part from the base surface is formed as flat top surfaces substantially parallel to the base surface. The long side surfaces and the top surfaces are continuous. Five bumps are formed between the short side surfaces and the top surfaces. The five bumps are formed in the same shape and the same size. Each of the bumps are composed of bottom surfaces and elevation surfaces. The bottom surfaces are surfaces substantially parallel to the base surface. The elevation surfaces are surfaces substantially perpendicular to the base surface. The plurality of embossing portions are arranged in the following state. The state previously described is a state in which the bumps of two adjacent embossing portions face each other. Furthermore, the state previously described is a state in which the long side surfaces of two adjacent embossing portions face each other. A clearance of about 1 mm is formed between the base surface and a front face fabric of the elongated material. The base surface does not contact the front face of the front face fabric of the elongated material. On the front face fabric side of the seat skin material, concave portions are formed by heating and pressing the embossing portions. The front face of the elongated material pressed at the portion where the bumps of the two embossing portions face each other has a shape in which gentle inclined surfaces are adjacent to each other. The front face of the elongated material pressed at the portion where the long side surfaces of the two embossing portions face each other is a steep inclined surface close to vertical. In the seat skin material, the surface gloss changes depending on a viewing direction. A fine level difference due to the bumps of the embossing portions is visually recognized as a thin horizontal line formed on the gentle inclined surface.

In patent document 3, a seat sheet material is disclosed. The seat sheet material is a skin material alone or a laminate body including the skin material. The seat sheet material has a concavo-convex shape on a front face side of the skin material. The concavo-convex shape is formed by heat press molding. The concave portion has fine unevenness on a bottom surface. As a result, the bottom surface of the concave portion is in a matted state without gloss. The bottom surface of such a concave portion is formed by heat pressing using a heat press mold. In the heat press mold, the fine unevenness are formed on the surface of the embossing portion. In the heat press mold, the fine unevenness are formed by a sand blast method.

CITATION LIST

Patent Literature

Patent Document 1: JP-A No. 2007-276285
Patent Document 2: Japanese Patent No. 5913755
Patent Document 3: JP-A No. 2005-261581

SUMMARY OF INVENTION

Problems to be Solved by the Invention

In a decorative sheet, a plurality of concave portions are formed on a front face of a base material. The decorative sheet is used as a front face fabric of various products. There may be a need to differentiate products from competing products by other business operators. In this case, for example, a decorative sheet different from a known decorative sheet is required in terms of design properties. As such, the inventor studied the following technology for a decorative sheet including a plurality of concave portions. The previously described technology is a technology that can give a viewer of the decorative sheet an impression that a plurality of concave portions are concave portions having different depths. At that time, the inventor considered the use of embossing as a manufacturing method for forming a plurality of concave portions on the front face of the base material.

An object of the present invention is to provide a new decorative sheet serving as a front face fabric of a predetermined product, an embossing method for manufacturing the decorative sheet and an embossing die for manufacturing the decorative sheet.

Solutions to Problems

One aspect of the present invention is a decorative sheet including: a base material, and a plurality of concave portions provided on a front face of the base material, and whose depth direction coincides with a thickness direction of the base material, wherein the plurality of concave portions include a first concave portion and a second concave portion, wherein the first concave portion includes a first concavo-convex pattern on a first inner surface of the first concave portion, wherein the second concave portion does not include the first concavo-convex pattern on a second inner surface of the second concave portion. In this case, in the decorative sheet, the second concave portion may include a second concavo-convex pattern which is different from the first concavo-convex pattern on the second inner surface.

According to the decorative sheet, when the front face of the decorative sheet is viewed from a predetermined direction, the following impression can be given to a viewer of the decorative sheet. The impression previously described is an impression that a plurality of concave portions having different depths are formed on the front face of the base material. Regardless of the shapes of the first concave portion and the second concave portion, one can be tricked that the first concave portion and the second concave portion are concave portions having different depths.

In the decorative sheet, the first concave portion may have, a bottom surface which is the first inner surface, and the first concavo-convex pattern on the bottom surface of the first inner surface, wherein the second concave portion may have, a bottom surface which is the second inner surface, and the second concavo-convex pattern on the bottom surface of the second inner surface. According to this configuration, for example, when the front face of the decorative sheet is directly viewed straight, it is possible to easily give the following impression to the viewer of the decorative sheet. The previously described impression is an impression that, as the above, a plurality of concave portions having different depths are formed on the front face of the base material.

In the decorative sheet, the first concave portion may include the first concavo-convex pattern on a first wall surface of the first inner surface, wherein the second concave portion may include the second concavo-convex pattern on a second wall surface of the second inner surface, wherein the first wall surface may be a portion of the first inner surface on a specific side of a direction which is orthogonal to the depth direction, wherein the second wall surface may be a portion of the second inner surface on a specific side of a direction which is orthogonal to the depth direction. According to this configuration, when the front face of the decorative sheet is viewed obliquely from the side opposite to the specific side in the direction orthogonal to the depth direction to the specific side, it is possible to easily give the following impression to the viewer of the decorative sheet. The previously described impression is an impression that, as the above, a plurality of concave portions having different depths are formed on the front face of the base material.

In the second concave portion, the second inner surface may be a smooth surface. According to this configuration, regarding the first concave portion of the plurality of concave portions, an aspect which the first inner surface include the first concavo-convex pattern can be obtained. Regarding the second concave portion of the plurality of concave portions, an aspect which the second inner surface is a smooth surface can be obtained. In the second concave portion, irregular reflection of light can be suppressed at the second inner surface. "Smooth" is, for example, means a state which does not have difference in height or a state in which there is no unevenness. Therefore, the previously described smooth surface include various surfaces which do not have difference in height or have no unevenness.

Another aspect of the present invention is an embossing method including: an embossing step which forms on a front face of a base material a plurality of concave portions whose depth direction coincides with a thickness direction of the base material, wherein the embossing step includes, a first concave portion step which forms a first concave portion among the plurality of concave portions, and a second concave portion step which forms a second concave portion among the plurality of concave portions, wherein, in the first concave portion step, the first concave portion which includes a first concavo-convex pattern on a first inner surface of the first concave portion is formed, and wherein, in the second concave portion step, the second concave portion which does not include a first concavo-convex pattern on a second inner surface of the second concave portion is formed.

Still another aspect of the present invention is an embossing die including: a molding unit which contacts a front face of a base material and which corresponds to a plurality of concave portions formed on a front face of a base material in a state in which a depth direction coincides with a thickness direction of the base material, wherein the molding unit includes, a convex-shaped first mold portion corresponding to a first concave portion among the plurality of concave portions, and a convex-shaped second mold portion corresponding to a second concave portion among the plurality of concave portions, wherein the first mold portion includes a first concavo-convex portion corresponding to a first concavo-convex pattern on a first outer surface of the first mold portion corresponding to a first inner surface which forms the first concave portion and is provided with the first concavo-convex pattern, wherein the second mold portion does not include the first concavo-convex portion on a second outer surface of the second mold portion corresponding to a second inner surface which forms the second concave portion and is not provided with the first concavo-convex pattern.

According to the embossing method and the embossing die described above, the decorative sheet described above can be manufactured. The embossing method and the embossing die can also be specified as the embossing method and the embossing die corresponding to the unspecified items which are not mentioned above among the items for specifying the decorative sheet described above.

Advantageous Effects of the Invention

According to the present invention, a new decorative sheet serving as a front face fabric of a predetermined product, an embossing method for manufacturing the decorative sheet and an embossing die for manufacturing the decorative sheet can be obtained.

DESCRIPTION OF THE EMBODIMENTS

Figure 1:
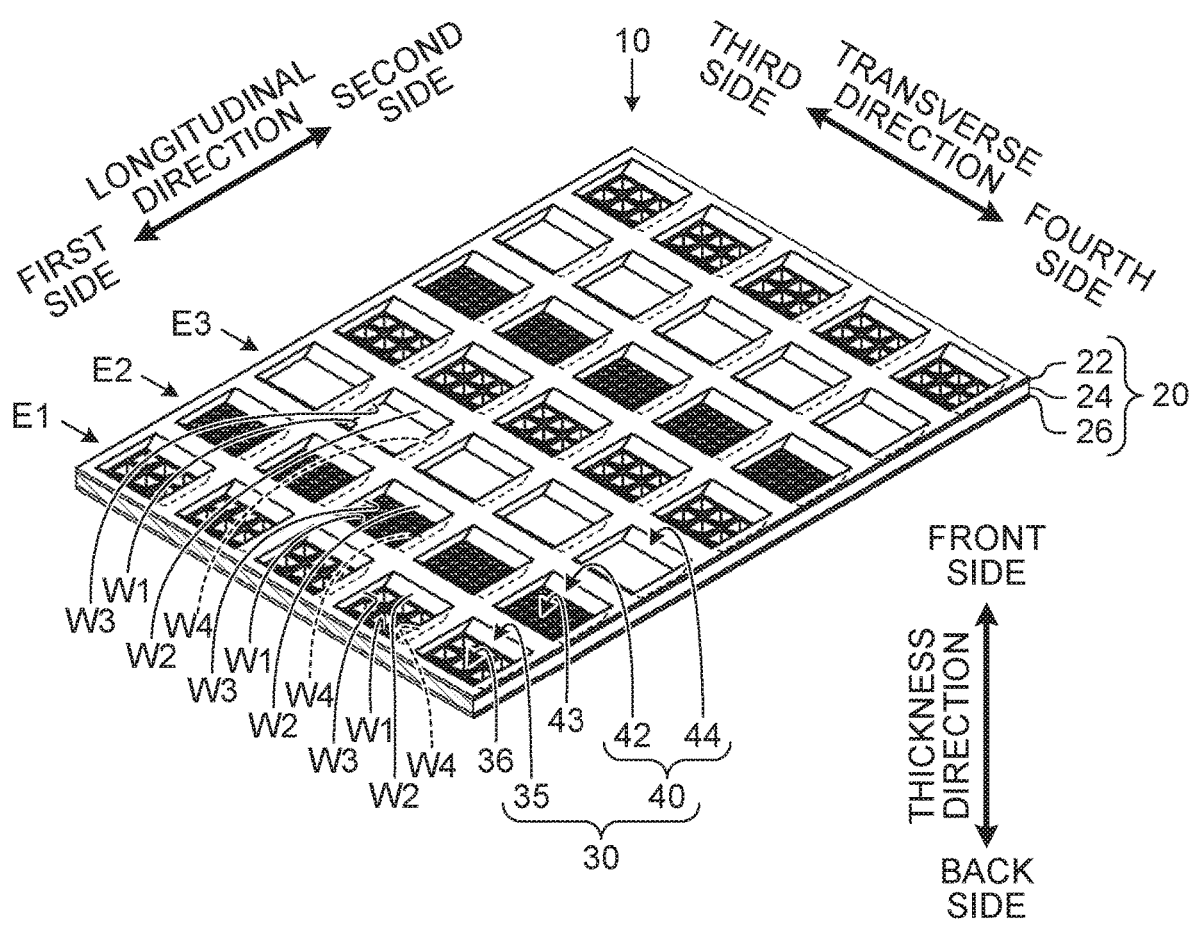
FIG. 1 is a perspective view which shows an example of a schematic structure of a decorative sheet.

Embodiments for carrying out the present invention will be described with reference to the drawings. The present invention is not limited to the configurations described below, and various configurations can be employed based on the same technical idea. For example, a part of the configurations shown below may be omitted or may be replaced by another configuration or the like. Other configurations may be included. Each drawing of the embodiment schematically shows a predetermined configuration. Therefore, in each drawing of the embodiment, correspondence with another drawing or correspondence with a numerical value which will be described later specifying the configuration in the drawing may not be accurate in some cases. In each drawing of the embodiment, hatching indicates a cross section. The broken line is a hidden line.

<Decorative Sheet>

A decorative sheet 10 will be described with reference to FIGS. 1 to 4. The decorative sheet 10 includes a base material 20 and a plurality of concave portions 30 (see FIG. 1). The plurality of concave portions 30 are provided on a front face of the base material 20. Accordingly, the front face of the decorative sheet 10 becomes a concavo-convex shape. In the embodiment, the decorative sheet 10 and the base material 20 are elongated sheet materials. The plurality of concave portions 30 are formed on the front face of the base material 20 by an embossing apparatus 50. The embossing apparatus 50 carries out an embossing method. The embossing apparatus 50 and the embossing method will be described later. A longitudinal direction of the base material 20 is a longitudinal direction of the decorative sheet 10, and a transverse direction of the base material 20 is a transverse direction of the decorative sheet 10. In the embodiment, the longitudinal direction of the decorative sheet 10 and the base material 20 is referred to as "longitudinal direction" and the transverse direction of the decorative sheet 10 and the base material 20 is referred to as "transverse direction" (see FIGS. 1 and 2). The longitudinal direction and the transverse direction are orthogonal to each other. One side of the longitudinal direction is referred to as "first side" and the other side of the longitudinal direction is referred to as "second side". One side of the transverse direction is referred to as "third side" and the other side of the transverse direction is referred to as "fourth side".

As the base material 20, various sheet materials are employed. For example, various sheet materials having different thicknesses are employed as the base material 20. The base material 20 is a laminated body of two or more layers. In this case, the decorative sheet 10 is also a laminated body having the same number of layers as the base material 20. In the embodiment, the base material 20 is a three-layer laminated body and includes a first sheet 22, a second sheet 24 and a third sheet 26 (see FIG. 2). The base material 20 has cushioning properties. In this case, the decorative sheet 10 is also a three-layer laminated body (see FIG. 1) having cushioning properties. However, the base material 20 may be a laminated body of two layers or four layers or more. When the base material 20 is a two-layer laminated body, the base material 20 may be a laminated body including the first sheet 22 and the second sheet 24. Other than this, the base material 20 may be a single layer sheet material which is not a laminated body. When the base material 20 is a single-layer sheet material, the base material 20 may be a sheet material that can be employed as the first sheet 22. Further, the base material 20 may be a thick sheet material having cushioning properties.

Figure 2:
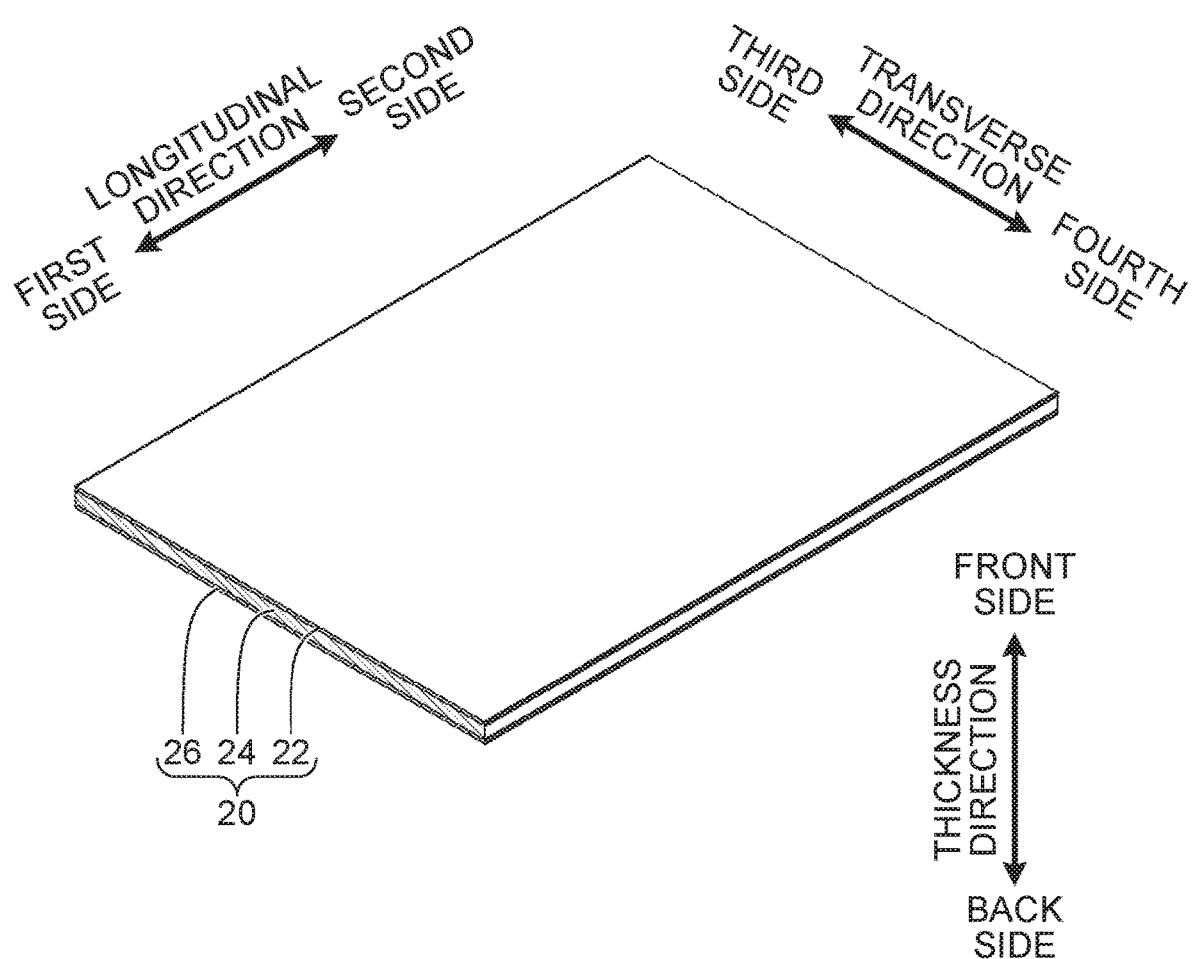
FIG. 2 is a perspective view which shows an example of a schematic structure of a base material. The base material corresponds to the decorative sheet of FIG. 1 before it is embossed.

In the embodiment, a thickness direction of the decorative sheet 10 and the base material 20 is referred to as "thickness direction" (see FIGS. 1 and 2). The thickness direction coincides with the direction in which the first sheet 22, the second sheet 24 and the third sheet 26 are laminated in the decorative sheet 10 and the base material 20. One side in the thickness direction is referred to as "front side" and the other side in the thickness direction is referred to as "back side". In the base material 20, the front side in the thickness direction is the side on which the first sheet 22 is provided, and the back side in the thickness direction is the side on which the third sheet 26 is provided. In each sheet material of the base material 20, the first sheet 22, the second sheet 24 and the third sheet 26, a front face is a surface that is on the front side in the thickness direction and a back face is a surface that is on the back side in the thickness direction (see FIG. 2). By embossing, the front face of the base material 20 becomes the front face of the decorative sheet 10 and the back face of the base material 20 becomes the back face of the decorative sheet 10 (see FIG. 1). That is, in the state of the decorative sheet 10, the front face of the decorative sheet 10 and the front face of the base material 20 mean the same surface. Likewise, in the state of the decorative sheet 10, the back face of the decorative sheet 10 and the back face of the base material 20 mean the same surface. For example, when the decorative sheet 10 is a front face fabric for interior products for a vehicle, the front face of the decorative sheet 10 is the surface of the previously described interior products. The user of the vehicle visually recognizes the front face of the decorative sheet 10 as the surface of the interior products.

A thickness of the base material 20 is appropriately determined in consideration of various conditions. However, the thickness of the base material 20 is better to be set to a predetermined value in the range of 0.3 to 19 mm. Preferably, the thickness of the base material 20 is set to a predetermined value in the range of 1.3 to 19 mm. Accordingly, a defined concave portion 30 can be formed on the front face of the base material 20. Each dimension of the base material 20 in the longitudinal direction and the transverse direction are appropriately determined in consideration of various conditions. The base material 20 is formed by bonding the first sheet 22 to the front face of the second sheet 24 and bonding the third sheet 26 to the back face of the second sheet 24 (see FIG. 2). A known method is employed for bonding the second sheet 24 and the first sheet 22 and bonding the second sheet 24 and the third sheet 26. For example, the bonding previously described is performed through an adhesive. Other than this, the bonding previously described is performed by frame laminate. When comparing the two construction methods previously described, the inventor considers that frame laminate is preferable in terms of process load at the time of manufacturing the base material 20 and weight reduction of the base material 20. Frame laminate is a technology that has already been put to practical use. Therefore, the description regarding the frame laminate is omitted.

As the first sheet 22, various sheet materials are employed. For example, fibrous sheet materials are employed as the first sheet 22. Examples of the fibrous sheet materials include woven fabrics, knitted fabrics, non-woven fabrics and natural leathers. Natural leather includes split leather. Further, as the first sheet 22, the following sheet material is employed. The sheet material previously described is a sheet material in which a synthetic resin is impregnated or laminated on a fibrous sheet material. Examples of such sheet material include artificial leathers, synthetic leathers and polyvinyl chloride leathers. Furthermore, a resin film is employed as the first sheet 22. Other than this, as the first sheet 22, a composite material of some or all of the sheet materials previously described is employed. A thickness of the first sheet 22 is better to be set to a predetermined value in the range of 0.3 to 5 mm. Preferably, the thickness of the first sheet 22 is set to a predetermined value in the range of 0.5 to 3 mm. However, the thickness of the first sheet 22 may be a value different from the range previously described. The thickness of the first sheet 22 is appropriately determined in consideration of various conditions.

In the first sheet 22, the fibrous sheet material may be a sheet material made of natural fibers or synthetic fibers. However, in view of the processability in embossing, the fibrous sheet material is better to be a sheet material made of synthetic fibers. Preferably, the fibrous sheet material is a sheet material made of thermoplastic resin fibers. Examples of the thermoplastic resin include polyolefin resins, polyester resins, polyamide resins, vinyl chloride resins and polyvinylidene chloride. Examples of the polyolefin resin include polyethylene and polypropylene. An example of the polyester resin includes polyethylene terephthalate. Examples of the polyamide resin include nylon 6 and nylon 66. The fibrous sheet material may be made of fibers made of one or two or more thermoplastic resins selected from the group including the plurality of resins previously described.

Assuming that the first sheet 22 is a sheet material in which a synthetic resin is impregnated or laminated on a fibrous sheet material. In this case, a known synthetic resin is employed as the resin to be impregnated or laminated. Examples of the synthetic resin previously described include polyurethane resins and vinyl chloride resins. The fibrous sheet material may be colored with a known dye or pigment. The dye or pigment is appropriately selected in consideration of various conditions.

The second sheet 24 has cushioning properties. Accordingly, the base material 20 has cushioning properties. As the second sheet 24, various sheet materials having cushioning properties are employed. An example of such sheet material includes a synthetic resin foam. An example of the synthetic resin foam includes a flexible polyurethane foam. A thickness of the second sheet 24 is better to be set to a predetermined value in the range of 1 to 14 mm. Preferably, the thickness of the second sheet 24 is set to a predetermined value in the range of 1 to 10 mm.

As the third sheet 26, various sheet materials are employed. For example, woven fabrics, knitted fabrics and non-woven fabrics are employed as the third sheet 26. In the third sheet 26, basis weight of the sheet material is appropriately determined in consideration of various conditions. For example, in the case in which the third sheet 26 is a woven fabric or a knitted fabric, the basis weight of the woven fabric or the knitted fabric is better to be set to a predetermined value in the range of 10 to 80 $g/m^2$. In the case in which the third sheet 26 is a non-woven fabric, the basis weight of the non-woven fabric is better to be set to a predetermined value in the range of 10 to 40 $g/m^2$. The third sheet 26 is, as the first sheet 22, in view of the processability in embossing, better to be a sheet material made of fibers made of thermoplastic resins. Examples of the previously described thermoplastic resins include above-described resins regarding the first sheet material 22.

The plurality of concave portions 30 include first concave portions 35 and second concave portions 40. The first concave portion 35 is the concave portion 30 which includes a first concavo-convex pattern 36 on a first inner surface. The second concave portion 40 is the concave portion 30 which does not include the first concavo-convex pattern 36 on a second inner surface. The first inner surface is an inner surface of the first concave portion 35. The second inner surface is an inner surface of the second concave portion 40. In the embodiment, in the case in which the first concave portion 35 and the second concave portion 40 are not distinct or are collectively called, they are referred to as "concave portion 30". The concave portion 30 corresponds to one or both of the first concave portion 35 and the second concave portion 40. In the case in which the first inner surface and the second inner surface are not distinct or are collectively called, they are referred to as "inner surface of the concave portion 30". The inner surface of the concave portion 30 corresponds to one or both of the first inner surface and the second inner surface. In the embodiment, the following two types of concave portions 30 are exemplified as the second concave portion 40. The first type of the second concave portion 40 is the concave portion 30 which includes a second concavo-convex pattern 43 on the second inner surface. The second concavo-convex pattern 43 is a concavo-convex pattern different from the first concavo-convex pattern 36. The second type of the second concave portion 40 is the concave portion 30 in which the second inner surface is a smooth surface. In the embodiment, "Smooth" means, for example, a state having no height difference or a state having no concavo-convex. Therefore, "smooth surface" includes, for example, a smooth plane, a smooth curved surface and a smooth inclined surface.

In the embodiment, for convenience of description, the second concave portion 40 which includes the second concavo-convex pattern 43 on the second inner surface is referred to as "third concave portion 42" and the second concave portion 40 in which the second inner surface is a smooth surface is referred to as "fourth concave portion 44". In the case in which the third concave portion 42 and the fourth concave portion 44 are not distinct or are collectively called, they are referred to as "second concave portion 40". The second concave portion 40 corresponds to one or both of the third concave portion 42 and the fourth concave portion 44. An inner surface of the third concave portion 42 is referred to as "third inner surface". An inner surface of the fourth concave portion 44 is referred to as "fourth inner surface". The second inner surface corresponds to one or both of the third inner surface and the fourth inner surface.

The concave portion 30 is a concave portion in which a depth direction coincides with the thickness direction. The depth direction is orthogonal to both the longitudinal direction and the transverse direction. The direction in which the concave portion 30 is opened on the front face of the base material 20 is a direction including the longitudinal direction and the transverse direction. The concave portion 30 does not penetrate the base material 20 in the thickness direction (see FIGS. 1, 3 and 4). That is, the concave portion 30 has a bottom. The inner surface of the concave portion 30 includes a bottom surface and wall surfaces W1, W2, W3 and W4. The bottom surface is a surface of the inner surface of the concave portion 30 that is the bottom of the concave portion 30. The wall surface W1 is a side surface provided on the first side in the longitudinal direction of the inner surface of the concave portion 30. The wall surface W2 is a side surface provided on the second side in the longitudinal direction of the inner surface of the concave portion 30. The wall surface W3 is a side surface provided on the third side in the transverse direction of the inner surface of the concave portion 30. The wall surface W4 is a side surface provided on the fourth side in the transverse direction of the inner surface of the concave portion 30. The wall surfaces W1, W2, W3 and W4 are connected in an annular shape and serve as an inner peripheral surface of the concave portion 30.

In the embodiment, the plurality of concave portions 30 have a common shape in the following points (see FIGS. 1, 3 and 4). That is, in the plurality of concave portions 30, the bottom surface is a rectangular shaped surface (see FIG. 3). Further, in the plurality of concave portions 30, the two wall surfaces W1 and W2 are the same rectangular shaped side surfaces that are inclined with respect to the front face of the base material 20 (see FIGS. 3 and 4). The inclination angles θ1 and θ2 are the same angle (see FIG. 4). The inclination angle θ1 is an angle formed by the front face of the base material 20 and the wall surface W1. The inclination angle θ2 is an angle formed by the front face of the base material 20 and the wall surface W2. Furthermore, in the plurality of concave portions 30, the two wall surfaces W3 and W4 are the same trapezoidal side surfaces that are perpendicular to the front face of the base material 20 (see FIGS. 1 and 4).

Figure 3:
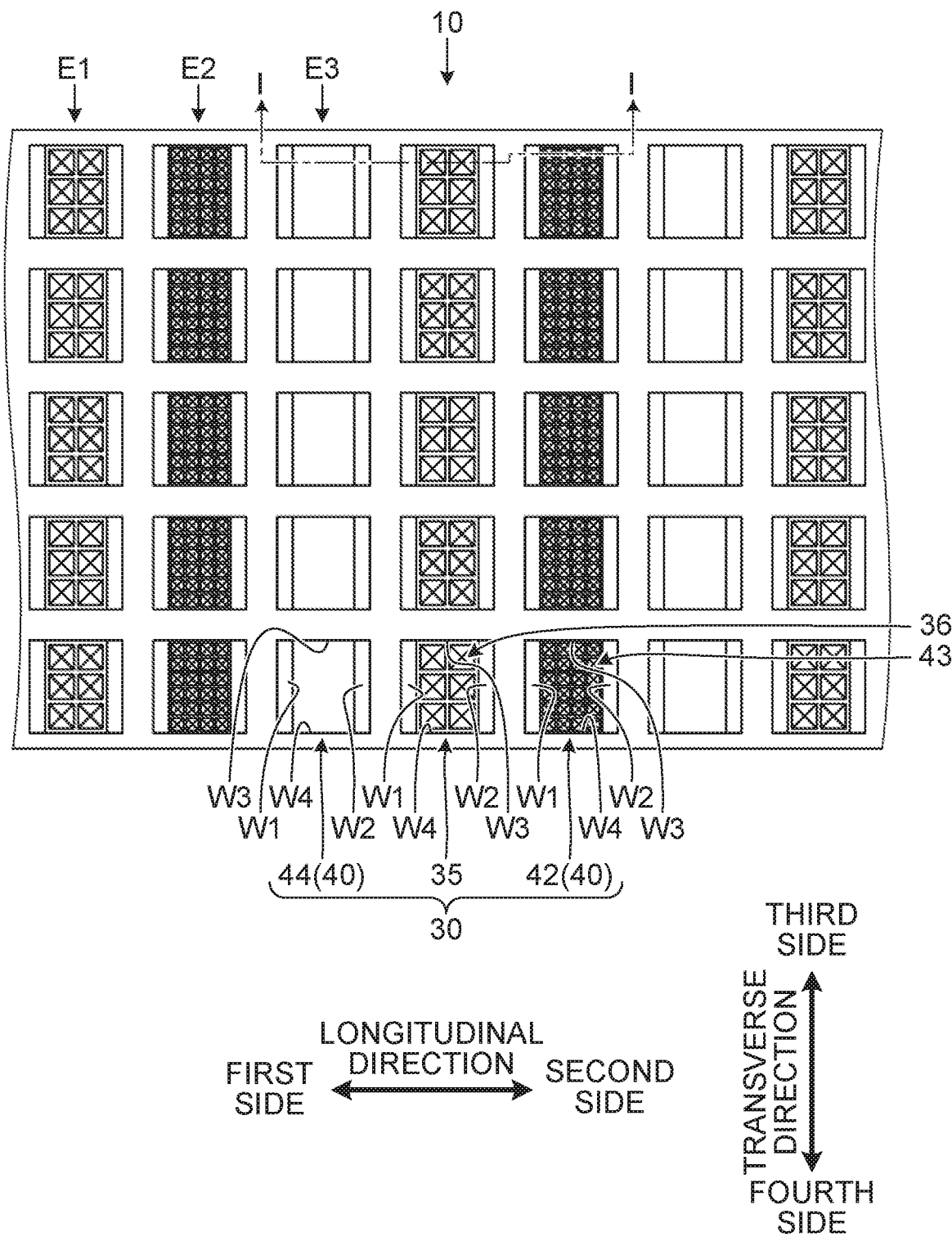
FIG. 3 is a plan view which shows an example of a schematic structure of the decorative sheet. It shows a front face of the decorative sheet of FIG. 1.
Figure 4:
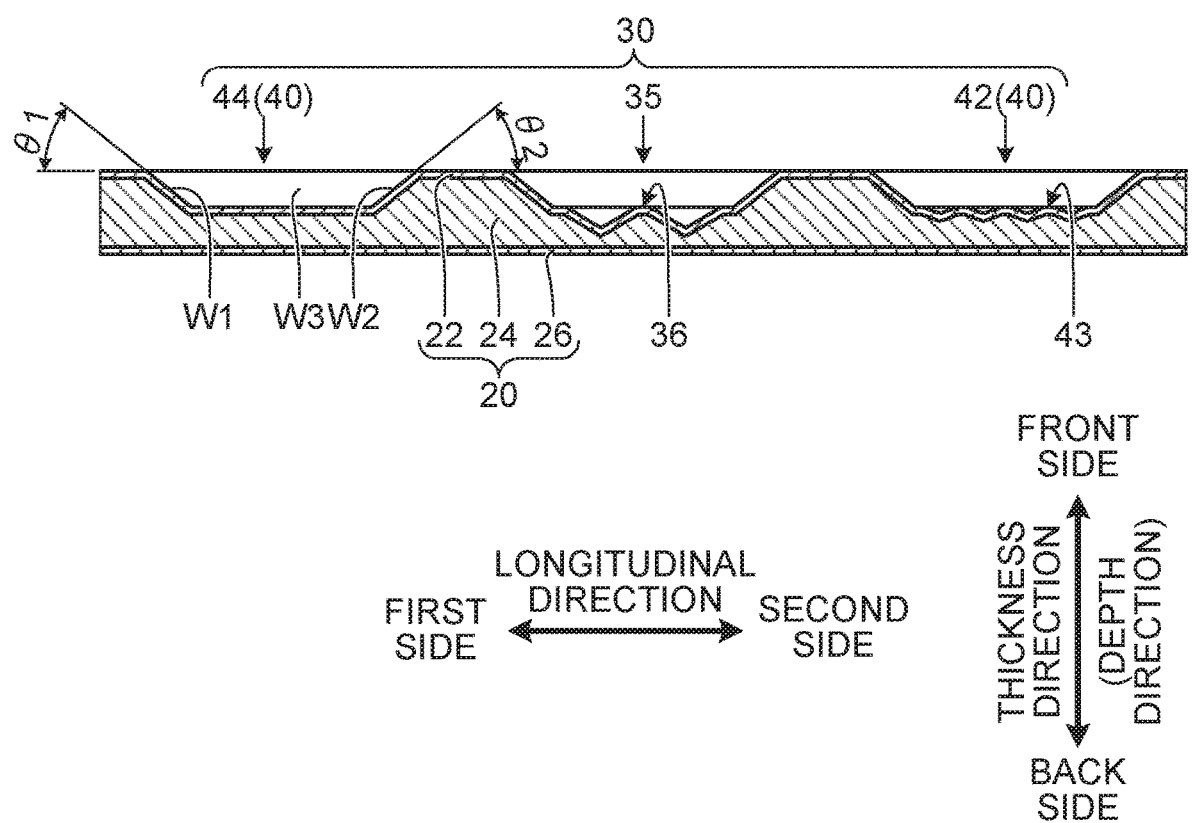
FIG. 4 is a side sectional view which shows a schematic structure of a concave portion. A first concave portion, and a third concave portion and a fourth concave portion as a second concave portion are shown. The cutting position corresponds to line I-I in FIG. 3.

Other than this, the plurality of first concave portions 35 include the first concavo-convex pattern 36 having a shape common to the bottom surface of the first inner surface, and the third concave portions 42 include the second concavo-convex pattern 43 having a shape common to the bottom surface of the third inner surface (see FIGS. 1, 3 and 4). In the first concave portion 35, the first concavo-convex pattern 36 is formed on the bottom surface along the front face of the base material 20, in the third concave portion 42, the second concavo-convex pattern 43 is formed on the bottom surface along the front face of the base material 20, and in the fourth concave portion 44, the bottom surface is formed as a parallel surface to the front face of the base material 20 (see FIG. 4). The difference between the first concave portion 35, the third concave portion 42 and the fourth concave portion 44 is the shape of the bottom surface, and in the first concave portion 35, the third concave portion 42 and the fourth concave portion 44, the wall surfaces W1, W2, W3 and W4 are the same (see FIGS. 1, 3 and 4).

However, the shapes of the concave portion 30 described above is an example. In the decorative sheet 10, the concave portion 30 may be a concave portion having a different shape from the shape described above. For example, the concave portion 30 may be a concave portion having a different inclination angles θ1 and θ2. Further, the concave portion 30 may be a concave portion having the bottom surface and the open end in any of a circular shape, an elliptical shape, a polygonal shape, a star shape and a flower shape. The concave portion 30 may be a concave portion which the bottom surface and the open end have the same shape or different shapes. Different shapes include similar shapes. Furthermore, the concave portion 30 may be a concave portion in which the center of the bottom surface and the center of the opening end are deviated in a state where the concave portion 30 is directly viewed straight from the front side in the thickness direction.

Other than this, the first concave portion 35 may be a concave portion in which the first concavo-convex pattern 36 is not formed along the front face of the base material 20, and the third concave portion 42 may be a concave portion in which the second concavo-convex pattern 43 is not formed along the front face of the base material 20. The fourth concave portion 44 may be a concave portion whose bottom surface is not parallel to the front face of the base material 20. Further, in the first concave portion 35 and the second concave portion 40, the shape of one or both of the bottom surface and the open end may have different shapes. In the third concave portion 42 and the fourth concave portion 44, the shape of one or both of the bottom surface and the open end may have different shapes. Furthermore, in a case in which the plurality of first concave portions 35 are provided, the shape of one or both of the bottom surface and the open end may be different shapes in some or all of the plurality of first concave portions 35. In a case in which a plurality of third concave portions 42 are provided, the shape of one or both of the bottom surface and the open end may be different shapes in some or all of the plurality of third concave portions 42. In a case in which a plurality of fourth concave portions 44 are provided, the shape of one or both of the bottom surface and the open end may be different shapes in some or all of the plurality of fourth concave portions 44.

In the decorative sheet 10, the plurality of concave portions 30 are arranged in the transverse direction and the longitudinal direction on the front face of the base material 20 (see FIGS. 1 and 3). That is, in the decorative sheet 10, five first concave portions 35 are arranged in the transverse direction at a predetermined interval, five third concave portions 42 are arranged in the transverse direction at a predetermined interval, and five fourth concave portions 44 are arranged in the transverse direction at a predetermined interval. The five first concave portions 35 form a concave portion line E1. The five third concave portions 42 form a concave portion line E2. The five fourth concave portions 44 form a concave portion line E3. In the decorative sheet 10, three concave portion lines E1, E2 and E3 are repeated in order of the concave portion lines E1, E2, E3, E1, ... in the longitudinal direction at a predetermine interval. However, the arrangement of such plurality of concave portions 30 is an example. The arrangement of the plurality of concave portions 30 is appropriately determined in consideration of various conditions.

In the decorative sheet 10, as the first concavo-convex pattern 36 and the second concavo-convex pattern 43, the following concavo-convex patterns are employed. That is, the first concavo-convex pattern 36 is a concavo-convex pattern in which two lines of the following first portion line are provided in the longitudinal direction at a predetermined interval. The first portion line is formed by arranging three quadrangular pyramidal concave-shaped portions in the transverse direction at a predetermined interval. The second concavo-convex pattern 43 is a concavo-convex pattern in which four lines of the following second portion line are provided in the longitudinal direction at a predetermined interval. The second portion line is formed by arranging six quadrangular pyramidal concave-shaped portions in the transverse direction at a predetermined interval. Comparing the areas of the open end of the concave-shaped portion on the front side in the thickness direction of the first concavo-convex pattern 36 and the second concavo-convex pattern 43, and comparing the height differences of the unevenness of the first concavo-convex pattern 36 and the second concavo-convex pattern 43, the first concavo-convex pattern 36 are both greater than the second concavo-convex pattern 43 (see FIGS. 1, 3 and 4).

However, as the first concavo-convex pattern 36 and the second concavo-convex pattern 43, various concavo-convex patterns are employed. The aspect of the first concavo-convex pattern 36 is appropriately determined in consideration of various conditions. The aspect of the second concavo-convex pattern 43 is appropriately determined in consideration of various conditions. In the first concavo-convex pattern 36 and the second concavo-convex pattern 43, the concave-shaped portion may be the same type or may be a different type. Assuming that the first concavo-convex pattern 36 and the second concavo-convex pattern 43 are concavo-convex patterns arranging the plurality of concave-shaped portions in the transverse direction and the longitudinal direction. In this case, in one or both of the first concavo-convex pattern 36 and the second concavo-convex pattern 43, the concave-shaped portion may have a shape different from the quadrangular pyramid shape. For example, the previously described concave-shaped portion may be a right-cone shaped (excluding quadrangular pyramid), frustum-shaped, columnar or hemispherical concave-shaped portion. The previously described concave-shaped portion may be a concave-shaped portion having an irregular shape. Other than this, in one or both of the first concavo-convex pattern 36 and the second concavo-convex pattern 43, the plurality of concave-shaped portions may be arranged annularly or irregularly. Further, in the first concavo-convex pattern 36 and the second concavo-convex pattern 43, the concave-shaped portions may be a linear strip continuous in the transverse direction or the longitudinal direction. In this case, for example, the first concavo-convex pattern 36 and the second concavo-convex pattern 43 may be a streaky concavo-convex pattern in which the linear striped concave-shaped portions are repeatedly arranged in the following direction at a predetermined interval. The previously described direction is a direction intersecting a direction in which the concave-shaped portions are continuous.

<Embossing Apparatus>

The embossing apparatus 50 will be described with reference to FIGS. 5 to 9. The embossing apparatus 50 is a processing apparatus that manufactures the decorative sheet 10. The embossing apparatus 50 conveys the elongated base material 20 fed out from a supply device 95 and performs embossing on the base material 20 (see FIG. 5). In the embossing apparatus 50, embossing is continuously performed. After being embossed by the embossing apparatus 50, the base material 20 is recovered by a recovery device 96 as the decorative sheet 10.

Figure 5:
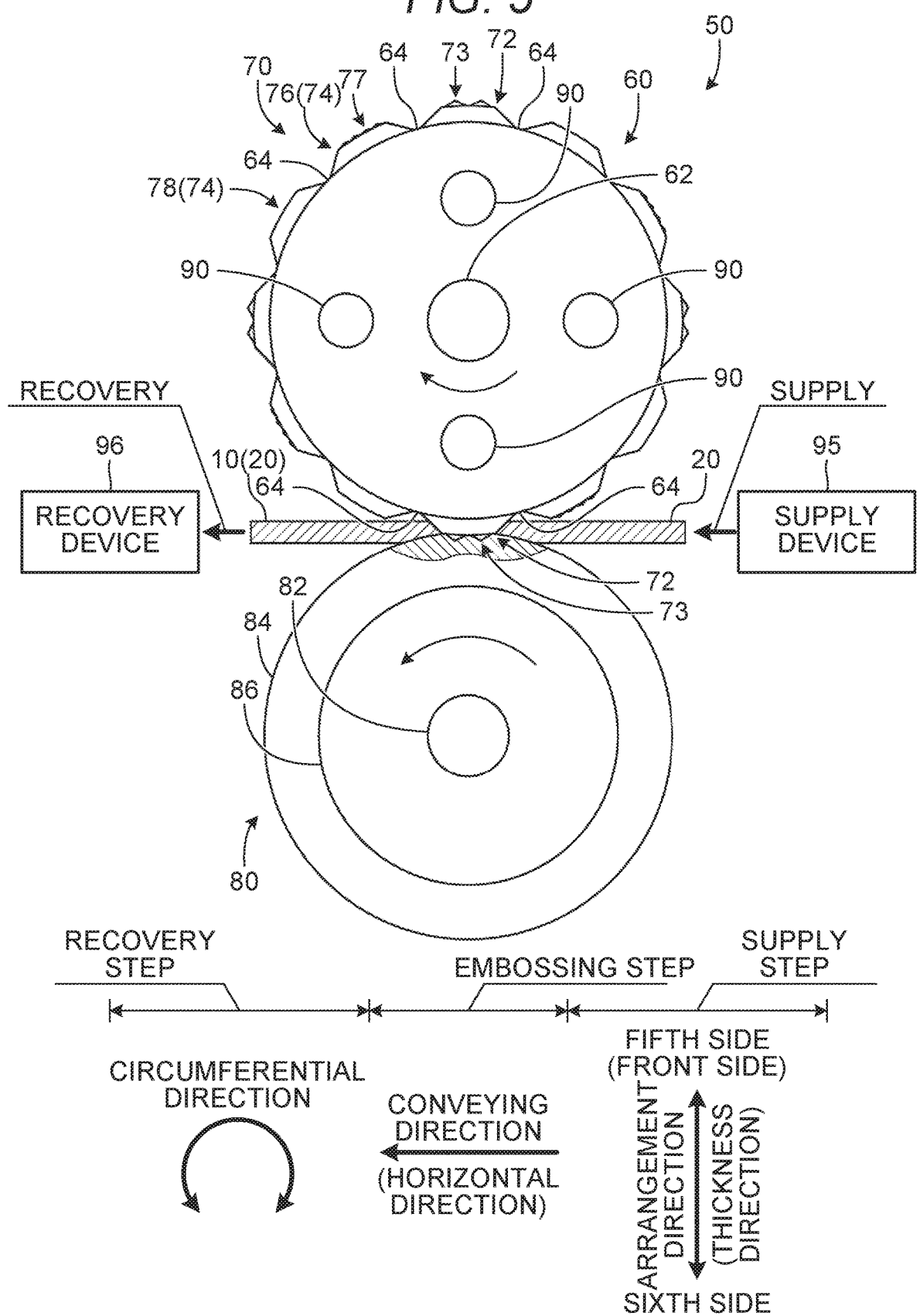
FIG. 5 is a side view which shows an example of a schematic structure of an embossing apparatus. An embossing die and an embossing receiving die have a roll shape. The state in which the embossing die is pressed against the embossing receiving die is shown. Among the base material and the decorative sheet, and an elastic unit of the embossing receiving die, a part into which a first mold portion of the embossing die bites is shown as a cross section. In the base material and the decorative sheet, parts corresponding to the embossing apparatus are shown.

In FIG. 5, the illustrations of the following parts are simplified. The previously described parts are the base material 20 and the decorative sheet 10, and the supply device 95 and the recovery device 96. The base material 20 and the decorative sheet 10 have an aspect of an elongated sheet material which is continuous from the supply device 95 to the recovery device 96. As the supply device 95, a supply device provided in a known embossing apparatus can be employed. As the recovery device 96, a recovery device provided in a known embossing apparatus can be employed. Therefore, the description regarding the supply device 95 and the recovery device 96 is omitted. In the embodiment, a direction in which the base material 20 and the decorative sheet 10 are conveyed from the supply device 95 toward the recovery device 96 is referred to as "conveying direction". The conveying direction is a direction along the longitudinal direction.

The embossing apparatus 50 is provided with an embossing die 60, an embossing receiving die 80 and heating unit 90. The embossing die 60 have a roll shape. In this case, the embossing die 60 may be referred to as an embossing roll. The embossing receiving die 80 have a roll shape. In this case, the embossing receiving die 80 may be referred to as a receiving roll or a backup roll.

The embossing die 60 and the embossing receiving die 80 are provided side by side in an arrangement direction. The embossing die 60 is provided on a fifth side in the arrangement direction. The embossing receiving die 80 is provided on a sixth side in the arrangement direction. In the embodiment, the arrangement direction is the vertical direction, and the conveying direction is the horizontal direction. Further, the fifth side of the arrangement direction is an upper side in the vertical direction and the sixth side of the arrangement direction is a lower side in the vertical direction. In this case, the thickness direction (a depth direction of the concave portion 30) of the base material 20 coincides with the vertical direction. A shaft 62 of the embossing die 60 and a shaft 82 of the embossing receiving die 80 are in a parallel state. A width direction (see FIG. 6) of the embossing die 60 and a width direction of the embossing receiving die 80 coincide with the transverse direction. The arrangement direction may be a different direction from the vertical direction. The conveying direction may be a different direction from the horizontal direction. The conveying direction is better to be a direction orthogonal to the arrangement direction.

The embossing die 60 rotates in a direction corresponding to the conveying direction with the shaft 62 as a rotation axis. A driving force is given to the embossing die 60 from a drive unit. The drive unit is attached to the shaft 62. Along with this, the embossing die 60 rotates as previously described. In FIG. 5, the illustration of the drive unit is omitted. An example of the drive unit includes a motor. The following arrow shown in FIG. 5 indicates a rotation direction of the embossing die 60. The previously described arrow is a single arrow shown inside the embossing die 60. The embossing die 60 is formed of a same material as a known embossing die. For example, the embossing die 60 is made of metal. An example of the metal forming the embossing die 60 includes steel.

Figure 6:
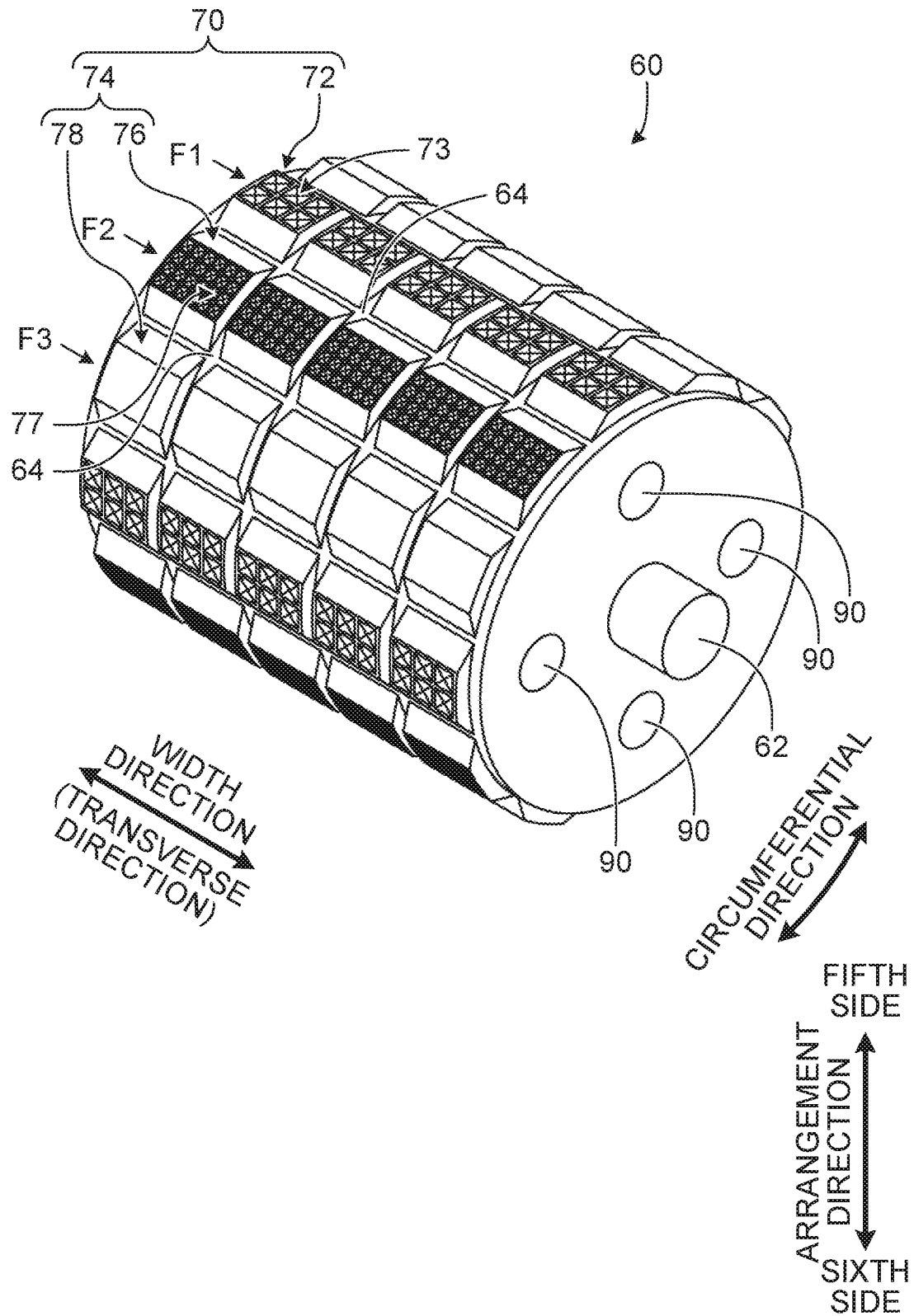
FIG. 6 is a perspective view which shows an example of a schematic structure of the embossing die. The first mold portion, and a third mold portion as a second mold portion is shown in a simplified manner.

The embossing die 60 includes molding units 70 (see FIGS. 5 and 6). The molding units 70 have a shape corresponding to the plurality of concave portions 30. When producing the embossing method, the molding units 70 are in contact with the front face of the base material 20 and presses the front face of the base material 20 (see FIG. 5). Along with this, the molding units 70 form the plurality of concave portions 30 on the front face of the base material 20. The molding units 70 include first mold portions 72 and second mold portions 74 (see FIGS. 5 and 6). The first mold portion 72 has a shape of a convex-shape corresponding to the first concave portion 35. The first mold portion 72 includes a first concavo-convex portion 73 (see FIGS. 6 and 7). The first concavo-convex portion 73 has a shape of a concavo-convex shape corresponding to the first concavo-convex pattern 36. The first concavo-convex portion 73 is provided to a first outer surface corresponding to the first inner surface. The first outer surface is an outer surface of the first mold portion 72. In the embodiment, the first concave portion 35 includes the first concavo-convex pattern 36 on the bottom surface (see FIGS. 1, 3 and 4). Therefore, in the first mold portion 72, the first concavo-convex portion 73 is provided to a top surface of the first mold portion 72 (see FIGS. 6 and 7). The top surface of the first mold portion 72 is a top face of the first mold portion 72 and is included to the first outer surface. In FIG. 6, the illustration of the first concavo-convex portion 73 is simplified.

A second mold portion 74 has a convex shape corresponding to the second concave portion 40. The second mold portion 74 does not include the first concavo-convex portion 73 (see FIGS. 5 and 6). That is, in the second mold portion 74, the first concavo-convex portion 73 is not provided on a second outer surface corresponding to the second inner surface. The second outer surface is an outer surface of the second mold portion 74. In the embodiment, third mold portions 76 and fourth mold portions 78 are shown as examples for the second mold portions 74 (see FIGS. 5 and 6). An outer surface of the third mold portion 76 is referred to as "third outer surface". An outer surface of the fourth mold portion 78 is referred to as "fourth outer surface". In the embodiment, in the case in which the third mold portion 76 and the fourth mold portion 78 are not distinct or are collectively called, they are referred to as "second mold portion 74". The second mold portion 74 corresponds to one of or both of the third mold portion 76 and the fourth mold portion 78. The second outer surface corresponds to one of or both of the third outer surface and the fourth outer surface.

The third mold portion 76 is the second mold portion 74 corresponding to the third concave portion 42. The third mold portion 76 has a shape of a convex-shape corresponding to the third concave portion 42. The third mold portion 76 includes a second concavo-convex portion 77 (see FIGS. 6 and 8). The second concavo-convex portion 77 has a shape of a concavo-convex shape corresponding to a second concavo-convex pattern 43. The second concavo-convex portion 77 is provided to the third outer surface corresponding to the third inner surface. In the embodiment, the third concave portion 42 includes the second concavo-convex pattern 43 on the bottom surface (see FIGS. 1, 3 and 4). Therefore, in the third mold portion 76, the second concavo-convex portion 77 is provided to a top surface of the third mold portion 76 (see FIGS. 6 and 8). The top surface of the third mold portion 76 is a top face of the third mold portion 76 and is included to the third outer surface. In FIG. 6, the illustration of the second concavo-convex portion 77 is simplified.

The fourth mold portion 78 is the second mold portion 74 corresponding to the fourth concave portion 44. The fourth mold portion 78 has a shape of a convex-shape corresponding to the fourth concave portion 44. The fourth mold portion 78 does not include the first concavo-convex portion 73 and further does not include the second concavo-convex portion 77. In the embodiment, the fourth concave portion 44 does not include a concavo-convex pattern on the entire fourth inner surface (see FIGS. 1, 3 and 4). Therefore, in the fourth mold portion 78, the entire fourth outer surface is a smooth surface which does not include a concavo-convex portion (see FIGS. 6 and 9).

Figure 7:
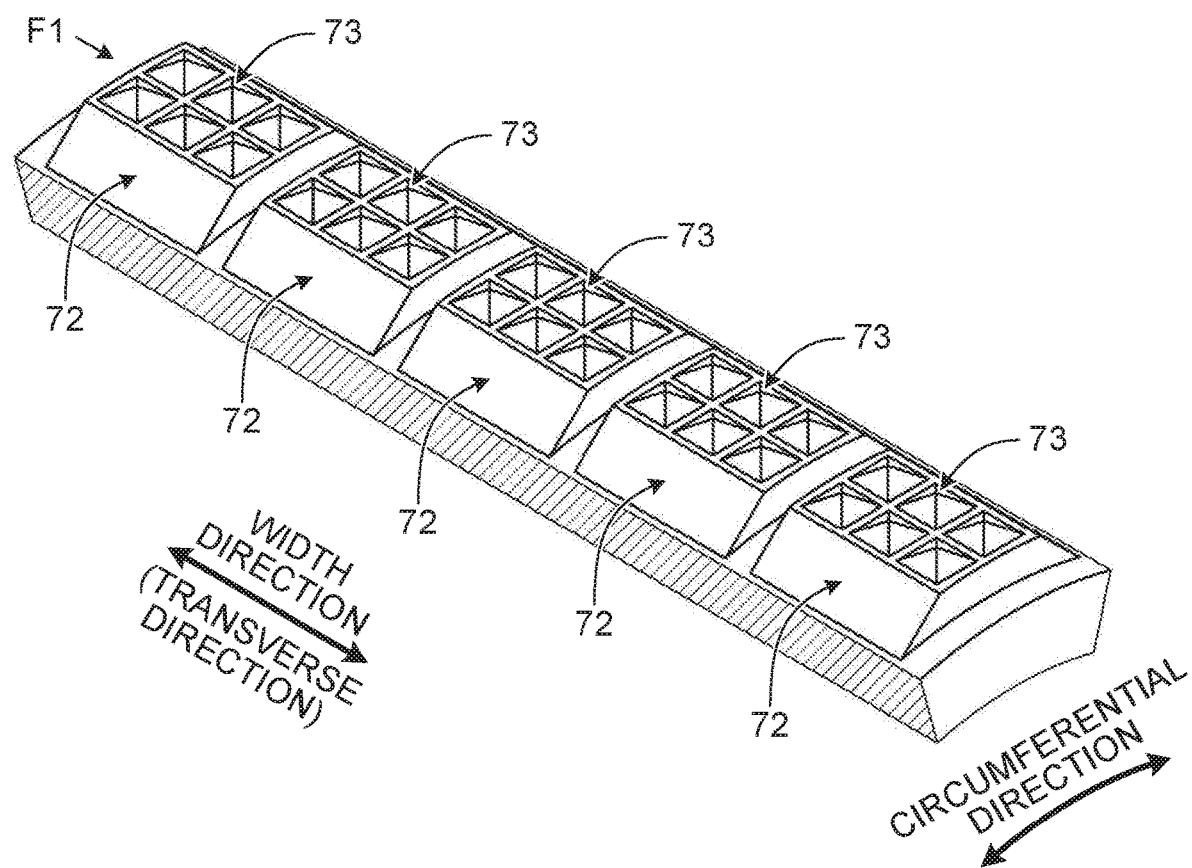
FIG. 7 is a perspective view which shows an example of a schematic structure of the first mold portion. It shows a part of the embossing die.
Figure 8:
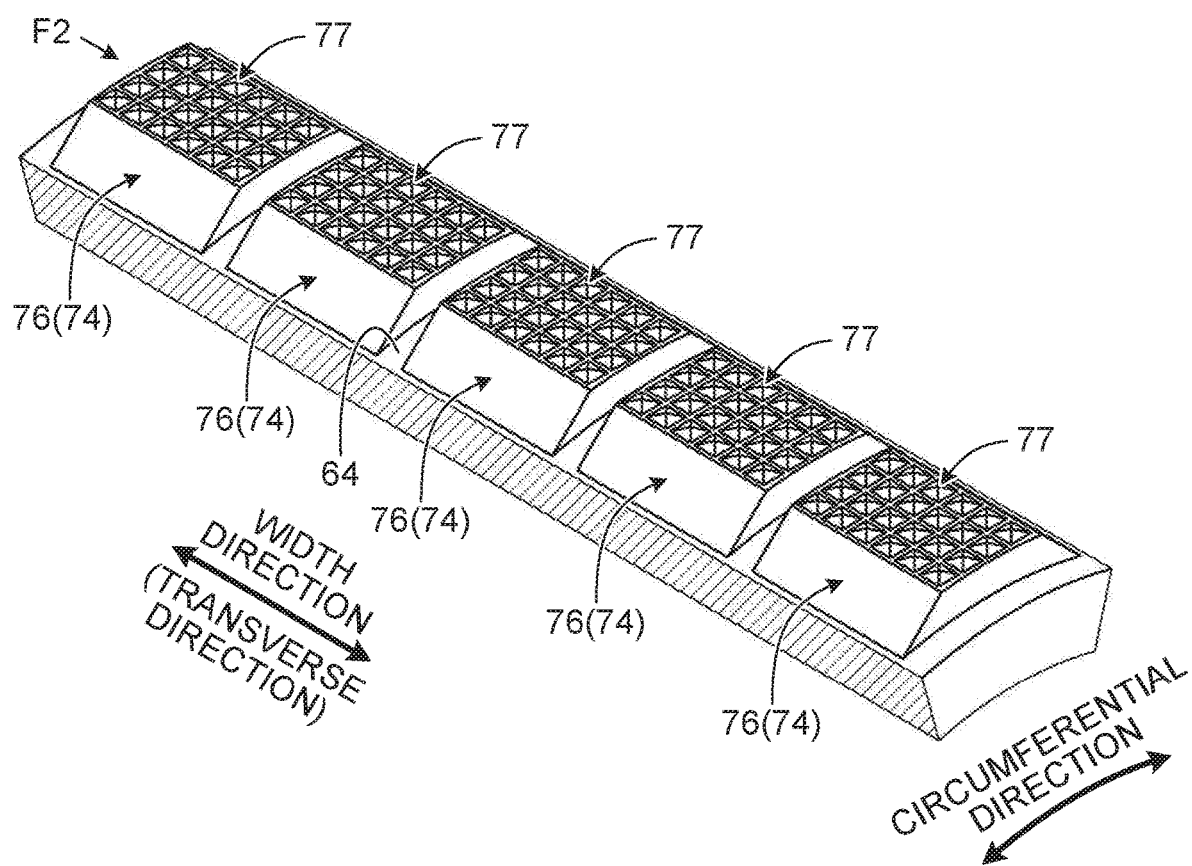
FIG. 8 is a perspective view which shows an example of a schematic structure of the third mold portion as the second mold portion. It shows a part of the embossing die.
Figure 9:
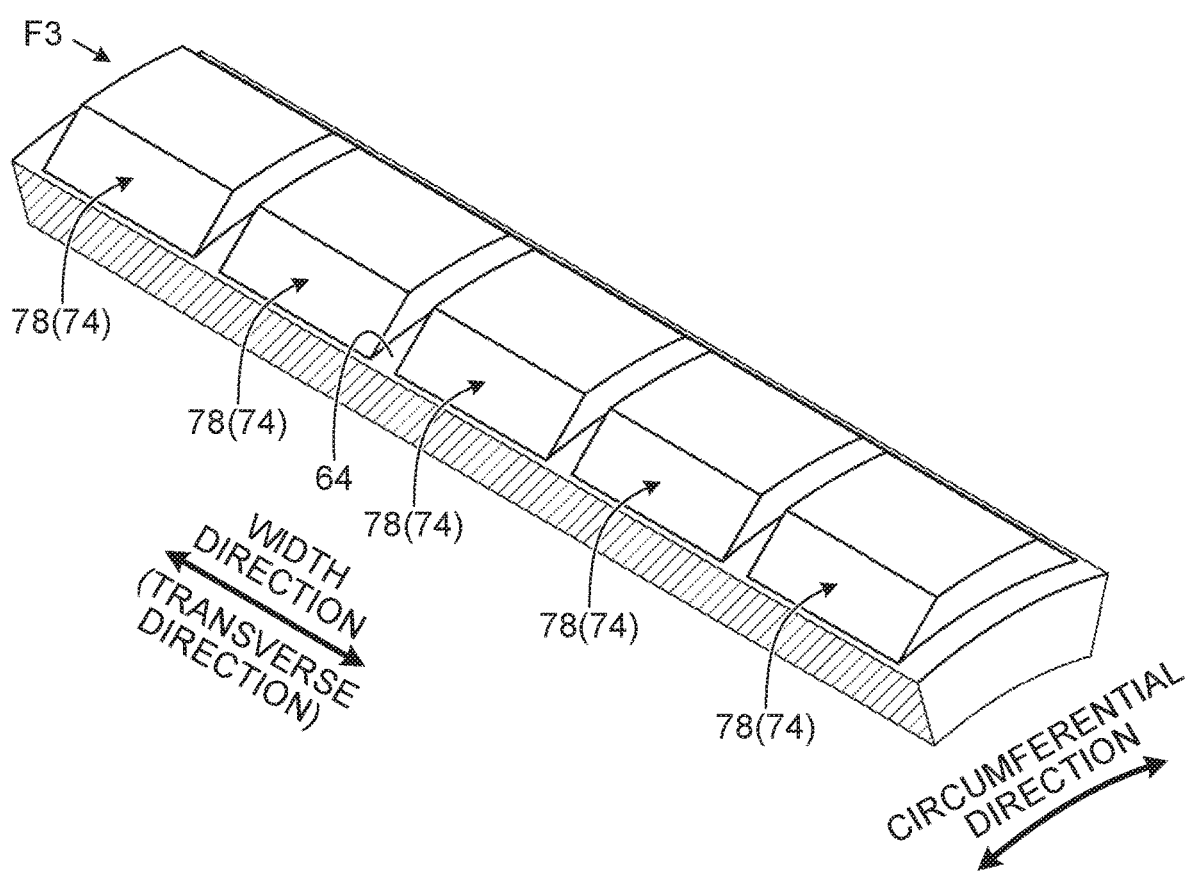
FIG. 9 is a perspective view which shows an example of a schematic structure of a fourth mold portion as the second mold portion. It shows a part of the embossing die.

The difference among the first mold portion 72, the third mold portion 76 and the fourth mold portion 78 is the shape of the top surface, and in the first mold portion 72, the third mold portion 76 and the fourth mold portion 78, side surfaces excluding the top surfaces are the same (see FIGS. 7 to 9). The top surface of the fourth mold portion 78 is a top face of the fourth mold portion 78 and is included to the fourth outer surface. The side surfaces of the first mold portion 72 are four surfaces corresponding to the wall surfaces W1, W2, W3 and W4 of the first concave portion 35, and correspond to an inner circumferential surface of the first concave portion 35. The side surfaces of the third mold portion 76 are four surfaces corresponding to the wall surfaces W1, W2, W3 and W4 of the third concave portion 42, and correspond to an inner circumferential surface of the third concave portion 42. The side surfaces of the fourth mold portion 78 are four surfaces corresponding to the wall surfaces W1, W2, W3 and W4 of the fourth concave portion 44, and correspond to an inner circumferential surface of the fourth concave portion 44.

The decorative sheet 10 includes the plurality of first concave portions 35, and includes the plurality of third concave portions 42 and the plurality of fourth concave portions 44 as the second concave portion 40 (see FIGS. 1, 3 and 4). Therefore, the molding unit 70 includes the plurality of first molding portions 72 to correspond to the plurality of first concave portions 35 (see FIGS. 6 and 7). Further, the molding unit 70 includes the plurality of third molding portions 76 to correspond to the plurality of third concave portions 42 (see FIGS. 6 and 8). Furthermore, the molding unit 70 includes the plurality of fourth molding portions 78 to correspond to the plurality of fourth concave portions 44 (see FIGS. 6 and 9).

In the decorative sheet 10, three lines of the concave portion lines E1, E2 and E3 along the transverse direction are repeated in the longitudinal direction at a predetermined interval (see FIGS. 1 and 3). Therefore, in the molding unit 70, the following three lines of mold portion lines F1, F2 and F3 are repeated in a circumferential direction at a predetermined interval (see FIGS. 5 and 6). The circumferential direction is a circumference direction with the shaft 62 as a center. The circumferential direction coincides with the rotating direction and the opposite direction thereof of the embossing die 60. The circumferential direction corresponds to the longitudinal direction. The mold portion line F1 is formed with the first mold portion 72 having the same number of the number of the first concave portion 35 of the concave portion line E1. In the mold portion line F1, the plurality of the first mold portions 72 are arranged in the width direction. The mold portion line F2 is formed with the third mold portion 76 having the same number of the number of the third concave portion 42 of the concave portion line E2. In the mold portion line F2, the plurality of the third mold portions 76 are arranged in the width direction. The mold portion line F3 is formed with the fourth mold portion 78 having the same number of the number of the fourth concave portion 44 of the concave portion line E3. In the mold portion line F3, the plurality of the fourth mold portions 78 are arranged in the width direction. That is, the molding unit 70 includes the plurality of first mold portions 72 in the following position. The position previously described is a position corresponding to the position of the plurality of first concave portions 35. Further, the molding unit 70 includes the plurality of third mold portions 76 in the following position. The position previously described is a position corresponding to the position of the plurality of third concave portions 42. Furthermore, the molding unit 70 includes the plurality of fourth mold portions 78 in the following position. The position previously described is a position corresponding to the position of the plurality of fourth concave portions 44.

The embossing receiving die 80 rotates in a direction corresponding to the conveying direction with the shaft 82 as a rotation axis. A rotation direction of the embossing receiving die 80 is opposite to the rotation direction of the embossing die 60. The embossing receiving die 80 is in contact with the back face of the base material 20. In the embossing apparatus 50, the embossing die 60 sandwiches the base material 20 together with the embossing receiving die 80. The embossing receiving die 80 is rotated in accordance with the rotation of the embossing die 60 while being in contact with the back face of the base material 20. The following arrow shown in FIG. 5 indicates the rotation direction of the embossing receiving die 80. The previously described arrow is a single arrow shown inside the embossing receiving die 80.

The embossing receiving die 80 includes an elastic unit 84 made of resin. The elastic unit 84 is provided on an outer peripheral surface of a main body unit 86. The elastic unit 84 is integrated with the main body unit 86 on the outer surface of the main body unit 86. The shaft 82 is fixed to the main body unit 86. The main body unit 86 is formed of the same material as the embossing die 60. In the elastic unit 84, the following surface is a smooth surface. The previously described surface is an outer peripheral surface of the elastic unit 84 that forms an outer peripheral surface of the embossing receiving die 80. In the embossing receiving die 80 having a roll shape, the outer peripheral surface of the elastic unit 84 is a smooth curved surface.

The elastic unit 84 is formed of a known resin. However, the elastic unit 84 is better to be formed of a resin having a hardness of D95 or less. Preferably, the elastic unit 84 is formed of a resin having a hardness of A90 or less. More preferably, the elastic unit 84 is formed of a resin having a hardness of A70 or less. Each value previously described is an average value of hardness acquired by the following hardness test method. The previously described hardness test method is carried out conforming to JIS K6253-3: 2012 (vulcanized rubber and thermoplastic rubber—how to determine hardness—part 3: durometer hardness). The difference between the hardness test methods due to the difference of the Types A and D is the testing machine, and the test piece shape, the test environment, the testing time and testing numbers are the same.

[Hardness Test Method]
Testing machine
Type D: Type D durometer (KOBUNSHI KEIKI CO., LTD. Digital rubber hardness tester DD4-D type)
Type A: Type A durometer (KOBUNSHI KEIKI CO., LTD. Digital rubber hardness tester DD4-A type)
Test piece shape (width×length×thickness): 40 mm×60 mm×11 mm
Test environment (temperature, relative humidity): 23±2° C., 50±5% RH
Measurement time: Moment
Number of measurement points: 5 points By forming the elastic unit 84 with the resin having a hardness of D95 or less, the following effects can be obtained. That is, in the embossing apparatus 50, the elastic unit 84 is deformed when the base material 20 passes between the embossing die 60 and the embossing receiving die 80. In this case, the deformation of the elastic unit 84 is elastic deformation. Due to the deformation of the elastic unit 84, the area of the elastic unit 84 in contact with the back face of the base material 20 can be increased. Along with this, the following plurality of concave portions 30 can be reproduced on the front face of the decorative sheet 10. The plurality of concave portions 30 previously described are the first concave portions 35 which match the shape of the first mold portions 72, the third concave portions 42 which match the shape of the third mold portions 76 and the fourth concave portions 44 which match the shape of the fourth mold portions 78. In the first mold portion 35, shine of the first inner surface can be suppressed. In the third mold portion 42 and the fourth mold portion 44, shine of the third inner surface and the fourth inner surface can be suppressed. In FIG. 5, the illustration of the elastic unit 84 is simplified. In FIG. 5, the elastic unit 84 is not illustrated in a state in which the previously described deformation has occurred.

As the resin which forms the elastic unit 84, the following resin whose hardness is D95 or less is employed. Examples of the resin previously described include rubbers, thermoplastics elastomers and plastics. The inventor considers that rubber is preferable among the resins previously described. Examples of the rubbers include silicone rubber, nitrile rubber, chloroprene rubber, ethylene-propylene rubber, butyl rubber, urethane rubber, fluoro-rubber and natural rubber. The inventor considers that silicone rubber or fluoro-rubber is preferable in terms of heat resistance. The inventor considers nitrile rubber, urethane rubber or natural rubber is preferable in terms of durability. The inventor considers that silicone rubber is preferable among the rubbers previously described in terms of versatility. Silicone rubber has excellent heat resistance as previously described. Silicone rubber is inexpensive. The rubber forming the elastic unit 84 may be one or two or more kinds of rubbers selected from the group including the plurality of rubbers previously described. Other than this, the rubber forming the elastic unit 84 may be pure rubber. However, this rubber may contain one or more known additives. Examples of the additives previously described include fillers, plasticizers, vulcanizing agents and anti-aging agents.

The heating unit 90 is provided in the embossing die 60. The heating unit 90 is embedded in the embossing die 60. The heating unit 90 is an electric heater. In the embodiment, four heating units 90 are embedded at equiangular intervals in the embossing die 60. However, the heating unit 90 may be a different type of heating unit from the electric heater. The number of the heating units 90 may be three or less or five or more. The type and number of the heating units 90 are appropriately determined in consideration of various conditions. The arrangement of the heating units 90 in the embossing die 60 is appropriately determined in consideration of various conditions.

The heating units 90 heat the embossing die 60 to a predetermined temperature. The previously described temperature is appropriately set according to the type of the base material 20. For example, the previously described temperature is appropriately set in consideration of the material of one or both of the first sheet 22 and the second sheet 24. Assuming that the first sheet 22 is polyethylene terephthalate. The melting point of polyethylene terephthalate is 260° C. In this case, the heating units 90 heat the embossing die 60 to a predetermined value in the range of 60 to 260° C. Preferably, the heating units 90 heat the embossing die 60 to a predetermined value in the range of 60 to 220° C. More preferably, the heating units 90 heat the embossing die 60 to a predetermined value in the range of 130 to 210° C.

<Embossing Method>

The embossing method will be described with reference to FIGS. 1, 2 and 5. The embossing method is performed by the embossing apparatus 50. The embossing method includes a supply step, an embossing step and a recovery step (see FIG. 5). The decorative sheet 10 of FIG. 1 is manufactured from the base material 20 of FIG. 2 by the embossing method. Therefore, it can be said that the embossing method is also the method for manufacturing the decorative sheet 10. In the embossing method, the supply step, the embossing step and the recovery step are sequentially and continuously performed while the base material 20 is continuously conveyed in the conveying direction. The supply step is continuously performed. The embossing step is continuously performed. The recovery step is continuously performed. In the embossing apparatus 50, in the case in which the embossing method is performed, the drive unit for the embossing die 60 is continuously driven.

In the embossing method, the plurality of concave portions 30 are formed on the front face of the base material 20 by pressing the base material 20 (see FIGS. 2 and 1). The heating units 90 heat the embossing die 60. The embossing method is performed in a state where the embossing die 60 is heated to a predetermined temperature. In the embossing apparatus 50, a heating unit such as the heating unit 90 is not provided in the embossing receiving die 80. Therefore, in the embossing method, the embossing receiving die 80 is not directly heated. However, in the embossing apparatus 50, the embossing receiving die 80 may be provided with a heating unit. Thereby, the embossing method can be performed in a state where the embossing receiving die 80 is heated to a predetermined temperature by the heating unit. When the heating unit is provided in the embossing receiving die 80, the temperature of the embossing receiving die 80 heated by the heating unit is appropriately set in consideration of various conditions. Whether or not the embossing receiving die 80 is provided with the heating unit is appropriately determined in consideration of various conditions.

Prior to performing the embossing method, the embossing apparatus 50 is adjusted so that the following position is in the following first state. The previously described position is a position in the arrangement direction of the embossing die 60 with respect to the front face of the base material 20. The first state is, when the base material 20 passes between the embossing die 60 and the embossing receiving die 80, a state in which a base surface 64 is not in contact with the front face of the base material 20. The base surface 64 is a region in the outer peripheral surface of the embossing die 60 where the first mold portions 72 and the second mold portions 74 are not provided. In other words, the base surface 64 is a region in the outer peripheral surface of the embossing die 60 at a bottom side of the convex shaped first mold portions 72 and a bottom side of the convex shaped second mold portions 74. The previously described bottom side is, when the radial direction of the embossing die 60 having a roll shape is used as a reference, the center side (the side of the shaft 62).

Other than this, the embossing apparatus 50 may be in the following second state and third state. The second state is a state in which the first mold portion 72 bites into the elastic unit 84 (see "first mold portion 72" shown in the sixth side of the arrangement direction in FIG. 5). Furthermore, the second state is a state in which the second mold portion 74 bites into the elastic unit 84. The third state is a state in which the following dimension is larger than the thickness of the base material 20. The previously described dimension is a dimension in the arrangement direction between the base surface 64 and the outer peripheral surface of the embossing receiving die 80. By performing the embossing method with the embossing apparatus 50 in the second state and the third state, the shape of the entire inner surface of the concave portion 30 can be defined. That is, the shapes of the bottom surfaces and the wall surfaces W1, W2, W3 and W4 of the concave portions 30 can be defined. Along with this, the design properties of the decorative sheet 10 can be improved.

The supply step is a step of supplying the base material 20 to the embossing apparatus 50 (see FIG. 5). That is, in the supply step, the base material 20 is fed out from the supply device 95. The base material 20 fed out from the supply device 95 is conveyed in the conveying direction and reaches the embossing apparatus 50.

The embossing step is a step of forming a plurality of concave portions 30 on the front face of the base material 20 (see FIG. 5). In the embossing step, the base material 20 that has reached the embossing apparatus 50 is embossed. The embossing step includes a first concave portion step and a second concave portion step. The first concave portion step is a step to form the first concave portion 35. The second concave portion step is a step to form the second concave portion 40. The second concave portion step include a third concave portion step and a fourth concave portion step. The third concave portion step is a step to form the third concave portion 42. The fourth concave portion step is a step to form the fourth concave portion 44.

In the embossing step, the base material 20 conveyed in the conveying direction passes between the embossing die 60 and the embossing receiving die 80 during conveyance. At this time, the base material 20 contacts the elastic unit 84 with its back face and is supported by the embossing receiving die 80 from the back side. The base material 20 contacts the molding unit 70 with its front face and is pressed by the molding unit 70. The base material 20 is heated by the heat from the embossing die 60 heated by heating units 90. In the molding unit 70, the first mold portion 72 and the second mold portion 74 bites into the base material 20. That is, in the embossing step, for example, the first mold portion 72 bites into the base material 20 (the first concave portion step). In doing so, in the first mold portion 72, the first concavo-convex portion 73 bites into the base material 20. Accordingly, the first concave portion 35 is formed. Then, the third mold portion 76 bites into the base material 20 (the third concave portion step of the second concave portion step). In doing so, in the third mold portion 76, the second concavo-convex portion 77 bites into the base material 20. Accordingly, the third concave portion 42 is formed. After this, the fourth mold portion 78 bites into the base material 20 (the fourth concave portion step of the second concave portion step). Accordingly, the fourth concave portion 44 is formed. By embossing step, the base material 20 is formed into the decorative sheet 10 (see FIGS. 2 and 1). In the embossing step, the base material 20 passes between the embossing die 60 and the embossing receiving die 80 without making the front face contacting the base surface 64.

The recovery step is a step of recovering the base material 20 that has passed through the embossing apparatus 50 (see FIG. 5). That is, in the recovery step, the decorative sheet 10 is recovered from the embossing apparatus 50 by the recovery device 96.

In the embossing method, a conveyance speed of the base material 20 is better to be set to a predetermined value in the range of 0.1 to 10 m/min. Preferably, the conveyance speed of the base material 20 is set to a predetermined value in the range of 0.3 to 5 m/min. By setting the conveyance speed of the base material 20 to 0.1 m/min or more, the following defects can be prevented from occurring to the inner surface of the concave portion 30. The defects previously described are shine, discoloration and tearing. The same applies to the back face of the decorative sheet 10. Furthermore, by setting the conveyance speed of the base material 20 to 0.1 m/min or more, it can suppress the embossing receiving die 80 deform by the heat from the embossing die 60. By setting the conveyance speed of the base material 20 to 10 m/min or less, when the base material 20 passes between the embossing die 60 and the embossing receiving die 80, a pressing force can be appropriately applied to the base material 20. A sufficient concave portion 30 can be formed on the front face of the base material 20.

In the embossing step, a pressing time of the base material 20 is better to be set to a predetermined value in the range of 0.01 to 5 seconds. Preferably, the pressing time of the base material 20 is set to a predetermined value in the range of 0.1 to 2 seconds. The pressing time of the base material 20 is appropriately set in consideration of the shape of the molding unit 70. By setting the pressing time of the base material 20 to 0.01 seconds or more, when the base material 20 passes between the embossing die 60 and the embossing receiving die 80, the pressing force can be appropriately applied to the base material 20. A sufficient concave portion 30 can be formed on the front face of the base material 20. By setting the pressing time of the base material 20 to 5 seconds or less, the following defects can be prevented from occurring to the inner surface of the concave portion 30. The previously described defects are shine, discoloration and tearing. The same applies to the back face of the decorative sheet 10. Furthermore, by setting the pressing time of the base material 20 to 5 seconds or less, the embossing receiving die 80 can be suppressed from being deformed by the heat from the embossing die 60.

In the embossing step, the pressing force of the base material 20 is better to be set to a predetermined value in the range of 200 to 2000 N/cm. By setting the pressing force of the base material 20 to 200 N/cm or more, when the base material 20 passes between the embossing die 60 and the embossing receiving die 80, the pressing force can be appropriately applied to the base material 20. A sufficient concave portion 30 can be formed on the front face of the base material 20. By setting the pressing force of the base material 20 to 2000 N/cm or less, the following defects can be prevented from occurring to the inner surface of the concave portion 30. The previously described defects are shine, discoloration and tearing. The same applies to the back face of the decorative sheet 10. Furthermore, by setting the pressing force of the base material 20 to 2000 N/cm or less, the embossing receiving die 80 can be suppressed from being deformed by the heat from the embossing die 60.

Effect of Embodiment

According to the embodiment, the following effects can be obtained.

(1) The decorative sheet 10 includes the base material 20 and the plurality of concave portions 30 (see FIGS. 1, 3 and 4). The plurality of concave portions 30 are provided on the front face of the base material 20. The plurality of concave portions 30 include the first concave portions 35 and the second concave portions 40. The first concave portions 35 include the first concavo-convex pattern 36 on the bottom surface of the first inner surface. The second concave portions 40 do not include the first concavo-convex pattern 36 on the second inner surface. The second concave portions 40 include the third concave portions 42 and the fourth concave portions 44. The third concave portions 42 include the second concavo-convex pattern 43 on the bottom surface of the third inner surface. The fourth concave portions 44 do not include the second concavo-convex pattern 43 on the fourth inner surface. In the fourth concave portion 44, the fourth inner surface is a smooth surface.

Therefore, in the case in which the front face of the decorative sheet 10 is viewed from a predetermined direction, the following impression can be applied to the viewer of the decorative sheet 10. The previously described impression is an impression that a plurality of concave portions 30 having different depths are formed on the front face of the base material 20. Regardless of the shapes of the first concave portion 35 and the second concave portion 40, one can be tricked that the first concave portion 35 and the second concave portion 40 are concave portions having different depths. In the fourth concave portion 44, irregular reflection of the light can be suppressed at the fourth inner surface.

(2) The embossing apparatus 50 is provided with the embossing die 60, the embossing receiving die 80 and the heating unit 90 (see FIG. 5). In the embossing die 60, the molding unit 70 includes the first mold portion 72 and the second mold portion 74 (see FIGS. 5 to 9). The first mold portion 72 corresponds to the first concave portion 35. The first mold portion 72 includes the first concavo-convex portion 73 on the top surface of the first outer surface (see FIGS. 6 and 7). The second mold portion 74 corresponds to the second concave portion 40. The second mold portion 74 does not include the first concavo-convex portion 73 on the second outer surface (see FIGS. 5, 6, 8 and 9). The second mold portion 74 includes the third mold portion 76 and the fourth mold portion 78. The third mold portion 76 include the second concavo-convex portion 77 on the top surface of the third outer surface (see FIGS. 6 and 8). The fourth mold portion 78 does not include the second concavo-convex portion 77 on the fourth outer surface. In the fourth mold portion 78, the fourth outer surface is a smooth surface (see FIGS. 6 and 9). The embossing apparatus 50 performs the embossing method. Therefore, the decorative sheet 10 can be manufactured by the embossing apparatus 50.

<Modifications>

The embodiment can also be configured as follows. Some configurations of modifications illustrated below may also be employed in combination as appropriate. In the following description, points different from the above description are described, and the description of similar points is omitted as appropriate.

Figure 11:
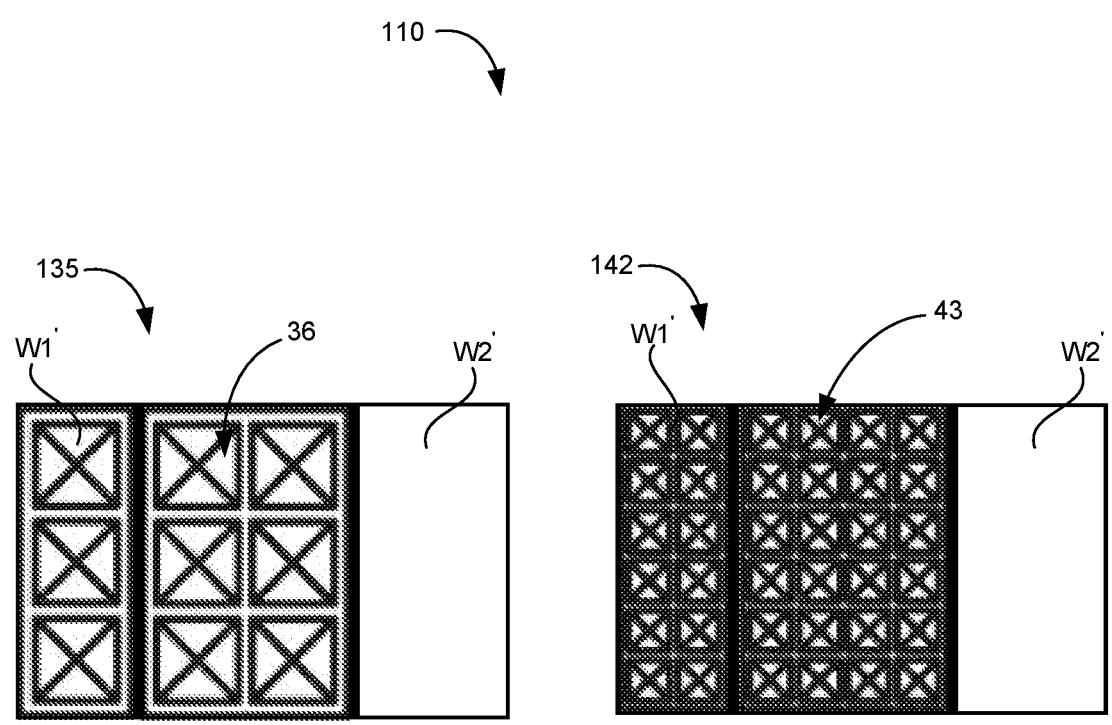
FIG. 11 is a plan view which shows an example of a schematic structure of the decorative sheet according to one embodiment of the disclosure.

(1) The first concave portion 35 includes the first concavo-convex pattern 36 on the bottom surface of the first inner surface and the third concave portion 42 includes the second concavo-convex pattern 43 on the bottom surface of the third inner surface (see FIGS. 1, 3 and 4). That is, the first concave portion 35 includes the first concavo-convex pattern 36 on a part of the first inner surface. The third concave portion 42 includes the second concavo-convex pattern 43 on a part of the third inner surface. The first concave portion may be a concave portion which includes the first concavo-convex pattern on the entire first inner surface, including all wall surfaces. The third concave portion may be a concave portion which includes the second concavo-convex pattern on the entire third inner surface, including all wall surfaces. In some examples, the concavo-convex patterns may be included on one wall surface, such as in decorative sheet 110 shown in FIG. 11. In decorative sheet 110 as depicted, first concave portion 135 includes first concavo-convex pattern 36 on the bottom surface and wall W1' and third concave portion 142 includes first concavo-convex pattern 43 on the bottom surface and wall W1'.

Assuming that the first concavo-convex pattern is provided on a specific surface of the first inner surface of the first concave portion. In this case, the area where the first concavo-convex pattern is provided may be a part of the specific surface of the first inner surface. For example, in the first concave portion, the first concavo-convex pattern may be provided on a part of the bottom surface of the first concave portion. The area where the first concavo-convex pattern in the first concave portion is provided is appropriately determined in consideration of various conditions. In the first mold portion, the first concavo-convex portion is provided in the following area in a shape to correspond to the first concavo-convex pattern. The previously described area is, within the first outer surface, an area corresponding to the area of the first inner surface where the first concavo-convex pattern is provided. Assuming that the second concavo-convex pattern is provided on a specific surface of the third inner surface of the third concave portion. In this case, the area where the second concavo-convex pattern is provided may be a part of the specific surface of the third inner surface. For example, in the third concave portion, the second concavo-convex pattern may be provided on a part of the bottom surface of the third concave portion. The area where the second concavo-convex pattern in the third concave portion is provided is appropriately determined in consideration of various conditions. In the third mold portion, the second concavo-convex portion is provided in the following area in a shape to correspond to the second concavo-convex pattern. The previously described area is, within the third outer surface, an area corresponding to the area of the third inner surface where the second concavo-convex pattern is provided.

(2) The concave portion 30 includes the bottom surface (see FIGS. 1, 3 and 4). In the decorative sheet, the concave portion may be a concave portion which does not include a bottom surface. Example of a concave portion which does not include a bottom surface is a right-cone shaped concave portion. For example, assuming that the decorative sheet is in the following first aspect and second aspect. The first aspect is an aspect with the concave portion being a quadrangular pyramid shape. The second aspect is an aspect providing a plurality of concave portions on the front face of the base material 20 with the following state. The previously described state is a state in which a first side and a second side of a square shape, which is an open end of the concave portion, is along the transverse direction, and a third side and a fourth side of the previously described square shape is along the longitudinal direction. In this case, for example, in the first concave portion, the first concavo-convex pattern is provided on a wall surface of the first side of the longitudinal direction, and in the third concave portion, the second concavo-convex pattern is provided on a wall surface of the first side of the longitudinal direction. The previously described two wall surfaces are wall surfaces that becomes the same position relation in the first concave portion and the third concave portion. However, in the first concave portion, the first concavo-convex pattern may be provided on a wall surface different from the wall surface of the first side in the longitudinal direction, and in the third concave portion, the second concavo-convex pattern may be provided on a wall surface different from the wall surface of the first side in the longitudinal direction. The first concavo-convex pattern and the second concavo-convex patter are better to be provided on wall surfaces that becomes the same position relation in the first concave portion and the third concave portion. Other than this, examples of a concave portion which does not include a bottom surface are a hemispherical shaped concave portion and a concave portion which penetrates the base material in the thickness direction (through hole). In the molding unit, the first mold portion has a shape to correspond to the first concave portion and the second mold portion has a shape to correspond to the second concave portion.

Figure 10:
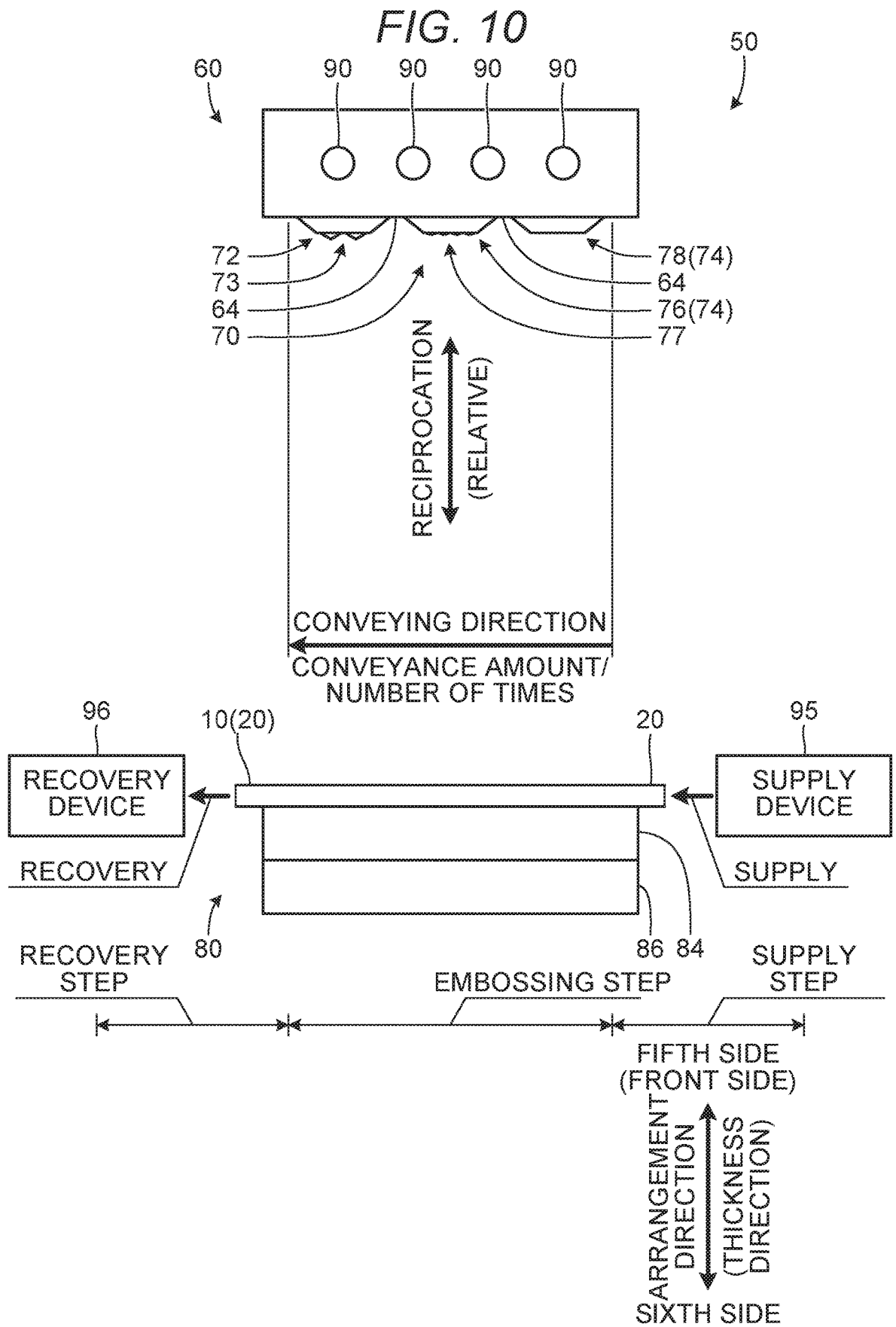
FIG. 10 is a side view which shows another example of a schematic structure of the embossing apparatus. The embossing die and the embossing receiving die have a flat plate shape. The state in which the embossing die is moved to a fifth side in an arrangement direction with respect to the embossing receiving die is shown. In the base material and the decorative sheet, parts corresponding to the embossing apparatus are shown.

(3) In the embossing apparatus 50, the embossing die 60 and the embossing receiving die 80 have a roll shape and is supported to be rotatable in a direction corresponding to the conveying direction (see FIG. 5). The embossing die and the embossing receiving die may have a shape different from the roll shape. For example, the embossing die 60 and the embossing receiving die 80, as shown in FIG. 10, may have a flat plate shape. In FIG. 10, in order to clarify the correspondence with FIG. 5, the reference numerals for the respective parts are the same as those mentioned above. In the embossing apparatus 50 of FIG. 10, as the embossing apparatus 50 of FIG. 5, the arrangement direction is the vertical direction and the conveying direction is the horizontal direction. In FIG. 10, as in FIG. 5, the illustrations of following parts are simplified. The previously described parts are the base material 20 and the decorative sheet 10, and the supply device 95 and the recovery device 96.

In the embossing method performed by an embossing apparatus 50 of FIG. 10, the embossing die 60 reciprocates relative to the embossing receiving die 80. In this relative reciprocation movement, a movement from the fifth side to the sixth side in the arrangement direction and a movement from the sixth side to the fifth side in the arrangement direction are repeated. The base material 20 is intermittently conveyed in the conveying direction in a state in which the embossing die 60 is moved to the fifth side in the arrangement direction with respect to the embossing receiving die 80. A single conveyance amount is an amount corresponding to the dimension of the molding unit 70 with respect to the conveying direction.

The embossing die 60 is provided with the heating unit 90. During the embossing method, the heating unit 90 heats the embossing die 60. A heating unit is not provided in the embossing receiving die 80. In the embossing receiving die 80, the following surface is a flat surface which is smooth. The surface previously described is an outer surface of the elastic unit 84 that forms an outer surface of the embossing receiving die 80. The elastic unit 84 is provided on an outer surface of the main body unit 86. In a state in which the embossing die 60 is moved to the sixth side in the arrangement direction, the base material 20 is sandwiched by the embossing die 60 and the embossing receiving die 80. The base material 20 contacts the elastic unit 84 with its back face and is supported by the embossing receiving die 80 from the back side. The base material 20 contacts the molding unit 70 with its front face and is pressed by the molding unit 70. In the molding unit 70, the first mold portion 72, and the third mold portion 76 and the fourth mold portion 78 as the second mold portion 74 bites into the base material 20. Along with this, the plurality of concave portions 30 are formed on the front face of the base material 20 in the same manner as described above.

The relative movement of the embossing die 60 and the embossing receiving die 80 is better to be performed by reciprocating the embossing die 60 in the arrangement direction in a manner in which the position of the embossing receiving die 80 is fixed (see FIG. 10). However, the relative movement of the embossing die 60 and the embossing receiving die 80 may be a different aspect from this. For example, the relative movement of the embossing die 60 and the embossing receiving die 80 may be performed by reciprocating both the embossing die 60 and the embossing receiving die 80 in the arrangement direction. In the embossing apparatus, the embossing die and the embossing receiving die may be, for example, as follows. That is, the embossing apparatus may include the roll shaped embossing die 60 (see FIG. 5) and the flat plate shaped embossing receiving die 80 (see FIG. 10).

(4) In the embossing receiving die 80, the elastic unit 84 is provided on the outer peripheral surface of the main body unit 86 (see FIG. 5). In the embossing receiving die, the main body unit 86 may be omitted. In the case in which the main body unit 86 in the roll shaped embossing receiving die is omitted, the shaft is fixed to the elastic unit. In the embossing receiving die, the shaft may be also formed of the same material as the elastic unit. Other than this, in the embossing receiving die, the elastic unit 84 may be omitted. For example, the embossing receiving die may be made of metal which does not include the elastic unit 84.

DESCRIPTION OF REFERENCE SIGNS

10 Decorative sheet
20 Base material
22 First sheet
24 Second sheet
26 Third sheet
30 Concave portion
35 First concave portion
36 First concavo-convex pattern
40 Second concave portion
42 Third concave portion
43 Second concavo-convex pattern
44 Fourth concave portion
50 Embossing apparatus
60 Embossing die
62 Shaft
64 Base surface
70 Molding unit
72 First mold portion
73 First concavo-convex portion
74 Second mold portion
76 Third mold portion
77 Second concavo-convex portion
78 Fourth mold portion
80 Embossing receiving die
82 Shaft
84 Elastic unit
86 Main body unit
90 Heating unit
95 Supply device
96 Recovery device
E1, E2, E3 Concave portion line
F1, F2, F3 Mold portion line
W1, W2, W3, W4 Wall surface
Θ1, Θ2 Inclination angle

The invention claimed is:

1. A decorative sheet comprising:
a base material having an upper surface, and
a plurality of concave portions provided on a front face of the base material, and whose depth direction coincides with a thickness direction of the base material,
wherein the plurality of concave portions include a first concave portion and a second concave portion, each of the first concave portion and the second concave portion being recessed relative to the upper surface and being separated by the upper surface,
wherein the first concave portion includes a first concavo-convex pattern on an entirety of a first bottom surface of the first concave portion, and
wherein the second concave portion includes a second concavo-convex pattern different from the first concavo-convex pattern on a second bottom surface of the second concave portion and the second concave portion does not include the first concavo-convex pattern on the second bottom surface.

2. The decorative sheet according to claim 1,
wherein the first concave portion includes the first concavo-convex pattern on a first wall surface adjacent to the first bottom surface,
wherein the second concave portion includes the second concavo-convex pattern on a second wall surface adjacent to the second bottom surface,
wherein the first wall surface is a portion of the first concave portion on a specific side of a direction which is orthogonal to the depth direction,
wherein the second wall surface is a portion of the second concave portion on a specific side of a direction which is orthogonal to the depth direction.

3. The decorative sheet according to claim 1, wherein, in the second concave portion, a second wall surface is a smooth surface.

4. The decorative sheet according to claim 3,
wherein the first concave portion includes the first concavo-convex pattern on a first wall surface adjacent to the first bottom surface,
wherein the second concave portion includes the second concavo-convex pattern on a third wall surface adjacent to the second bottom surface,
wherein the first wall surface is a portion of the first concave portion on a specific side of a direction which is orthogonal to the depth direction,
wherein the third wall surface is a portion of the second concave portion on a specific side of a direction which is orthogonal to the depth direction.

5. A decorative sheet comprising:
a base material having an upper surface, and
a plurality of concave portions provided on a front face of the base material, and whose depth direction coincides with a thickness direction of the base material,
wherein the plurality of concave portions include a first concave portion and a second concave portion, each of the first concave portion and the second concave portion being recessed relative to the upper surface and being separated by the upper surface, wherein the first concave portion includes a first concavo-convex pattern on a first bottom surface of the first concave portion, the first concavo-convex pattern repeating in a longitudinal direction and the first concavo-convex pattern repeating in a transverse direction perpendicular to the longitudinal direction, the longitudinal and transverse directions being perpendicular to the depth direction, and wherein a second bottom surface of the second concave portion does not include any pattern disposed on the first bottom surface.

6. A decorative sheet comprising:

a base material having an upper surface, and a plurality of concave portions provided on a front face of the base material, and whose depth direction coincides with a thickness direction of the base material, wherein the plurality of concave portions include a first concave portion and a second concave portion, each of the first concave portion and the second concave portion being recessed relative to the upper surface and being separated by the upper surface, wherein the first concave portion includes a first concavo-convex pattern on an entirety of a first bottom surface of the first concave portion, wherein the second concave portion includes a second concavo-convex pattern on a second bottom surface of the second concave portion and does not include the first concavo-convex pattern on the second bottom surface of the second concave portion, and wherein a first height difference between high and low points on the first concavo-convex pattern is larger than a second height difference between high and low points on the second concavo-convex pattern.

* * * * *